US007694230B2

(12) United States Patent
Terada

(10) Patent No.: US 7,694,230 B2
(45) Date of Patent: Apr. 6, 2010

(54) DIGITAL MIXER AND PROGRAM

(75) Inventor: Kotaro Terada, Hamamatsu (JP)

(73) Assignee: Yamaha Corporation, Hamamatsu-shi (JP)

(*) Notice: Subject to any disclaimer, the term of this patent is extended or adjusted under 35 U.S.C. 154(b) by 698 days.

(21) Appl. No.: 11/517,532

(22) Filed: Sep. 6, 2006

(65) Prior Publication Data

US 2007/0061729 A1 Mar. 15, 2007

(30) Foreign Application Priority Data

Sep. 9, 2005 (JP) ............................ 2005-261803
Sep. 9, 2005 (JP) ............................ 2005-261805

(51) Int. Cl.
*G06F 3/048* (2006.01)

(52) U.S. Cl. ........................ 715/771; 715/716; 715/727

(58) Field of Classification Search .................. 715/771
See application file for complete search history.

(56) References Cited

U.S. PATENT DOCUMENTS 6,728,382 B1 * 4/2004 Silfvast ...................... 381/119
6,747,678 B1 * 6/2004 Katayama et al. ........... 715/773
6,868,225 B1 * 3/2005 Brown et al. .................. 386/83
2002/0015504 A1 * 2/2002 Kohno et al. ................ 381/119
2003/0059066 A1 3/2003 Kohyama et al.
2004/0008851 A1 * 1/2004 Hagiwara ................... 381/104
2004/0030425 A1 * 2/2004 Yeakel et al. ................. 700/94
2005/0239397 A1 * 10/2005 Kreifeldt et al. ........... 455/3.01
2005/0289613 A1 * 12/2005 Lawrence .................... 725/80

FOREIGN PATENT DOCUMENTS

JP 2003-100066 4/2003

OTHER PUBLICATIONS

Owner's Manual for PM5D Digital Mixing Console PM5D/PM5D-RH, Yamaha Corporation, 2004.

* cited by examiner

*Primary Examiner*—Boris Pesin
*Assistant Examiner*—Anil N Kumar
(74) *Attorney, Agent, or Firm*—Morrison & Foerster LLP

(57) ABSTRACT

Once bookmark registration is instructed by user operation while any detailed setting window is being displayed on a background screen on a display of a digital mixer, only the currently-displayed detailed setting window is bookmark-registered. Thus, once bookmark call operation is performed while a desired background screen is being displayed, the currently-displayed background screen is maintained as-is, and the called detailed setting window is displayed on the background screen. Further, bookmark registration can be made in association with a mixer channel, and, in response to bookmark call operation, parameters of the associated channel can be called and displayed.

6 Claims, 14 Drawing Sheets

DIGITAL MIXER AND PROGRAM

BACKGROUND OF THE INVENTION

The present invention relates to digital mixers and programs for use in, for example, adjustment of audio signals in music content recording and concerts.

Japanese Patent Application Laid-open Publication No. 2003-100066 discloses a digital mixer, which includes an input/output channel section for processing audio signals of a plurality of input/output channels by means of various filters etc. In the disclosed digital mixer, there are also provided effecters, graphic equalizers, etc. insertable in desired ones of the input/output channels. Positioning all of displays and operators for setting a multiplicity of parameters for the input/output channel section, effecters, etc. on an operation panel is unpractical, because, in such a case, the operation panel has to have an enormous area. Thus, today, it is common to provide a multi-purpose display on the operation panel and set/display a wide variety of parameters by switching between various setting screens displayed on the display. When parameters for the input/output channel section are to be set, for example, any one of the input/output channels is selected, and detailed parameters are set for the selected input/output channel. Such a selected input/output channel will be referred to "selected channel".

Further, "PM5D Instruction Manual" published by Yamaha Corporation in 2004 (hereinafter "Non-patent Literature 1") discloses a digital mixer, which has a bookmark function (referred to as "user define key function" in Non-patent Literature 1) to allow a particular setting screen to be readily called to a display. According to the disclosure in Non-patent Literature 1, a desired setting screen is bookmarked (or bookmark-registered), and then the thus-bookmarked setting screen can be called and displayed on the display by a user merely depressing a predetermined bookmark button. Where the bookmarked setting screen pertains to setting of parameters of a given input/output channel, bookmark data indicative of the bookmarked content does not include data indicating the selected channel. Namely, according to the conventional technique, the channel selected at the time of the bookmark-registration of the setting screen is ignored, and the called setting screen will have reflected therein parameters of a channel selected at the time of the screen calling.

When the user performs operation on the setting screen, a detailed setting window for displaying/setting more detailed content about a desired portion of the setting screen is sometimes displayed as a popup window. Thus, there has been a need for arrangements to permit bookmark registration of such a detailed setting window as well. However, if the displayed detailed setting window is bookmark-registered as-is, the bookmark data would include data indicative of both of the background setting screen and popped-up detailed setting window; thus, in this case, there arises the problem that both the background setting screen and the detailed setting window are called in response to operation of the bookmark button. Namely, with the technique disclosed in Non-patent Literature 1, it was impossible to call only the detailed setting window with a current setting screen as a background screen.

Further, because the conventional bookmark data does not include information indicating a selected channel, it was impossible to bookmark a particular setting screen pertaining to a particular channel. Such an arrangement may be convenient when a user wants to make settings for a plurality of channels using a bookmarked parameter setting screen while changing the selected channel, but it tends to be inconvenient for another user who wants to call a screen for editing particular parameters of a particular channel. Especially, where a popped-up detailed setting window is to be bookmarked, there would arise frequent changes in the selected channel because the window is intended for adjustment of a particular channel; thus, the necessary operation tends to become complicated.

SUMMARY OF THE INVENTION

In view of the foregoing, it is an object of the present invention to provide a digital mixer and program which permit appropriate bookmarking of a detailed setting window that is intended for setting details of setting content displayed on a setting screen.

It is another object of the present invention to provide a digital mixer and program which allow relationship between a bookmarked screen and a selected channel to be set as desired by a user.

In order to accomplish the above-mentioned objects, the present invention provides an improved digital mixer, which comprises: a storage section that stores therein operational data including a plurality of parameters for controlling signal processing; a signal processing section that performs mixing processing on the basis of the operational data; a display; a background screen selection section that, in response to selection of a desired background screen, causes a selected background screen to be displayed on the display; a detailed setting window display section that, in accordance with an instruction for displaying a given detailed setting window on the background screen, displays the given detailed setting on the background screen currently displayed on the display; a parameter control section that, in response to value change operation for changing a value of any one of the parameters, changes a value of the parameter included in the operational data and displayed on the background screen or on the detailed setting window currently displayed on the display; a bookmark registration section that, when any detailed setting window is being displayed at a time of bookmark-registration operation, stores, into the storage section, designation data indicative of at least the detailed setting window in response to the bookmark-registration operation, wherein, when no detailed setting window is being displayed at a time of bookmark-registration operation, the bookmark registration section stores, into the storage section, designation data indicative of at least a currently-displayed background screen in response to the bookmark-registration operation; and a bookmark call section that causes a screen, indicated by the designation data stored in the storage section, to be displayed on the display, wherein, when the designation data includes data indicative of the detailed setting window, the bookmark call section causes the detailed setting window to be displayed on a currently-displayed background screen, but, when the designation data includes no data indicative of any detailed setting window but includes data indicative of a given background screen, the bookmark call section causes the given background screen to be displayed.

According to the present invention, when any detailed setting window is being displayed at the time of bookmark-registration operation, designation data indicative of the detailed setting window is stored into the storage section. Thus, when bookmark call operation is performed and if the designation data includes data indicative of any detailed setting window, the detailed setting window is displayed on a currently-displayed background screen. Thus, the present invention permits bookmarking of each of the background screen and detailed setting window. Further, when a detailed setting window is bookmarked, a pop-up screen can be displayed in front of a currently-displayed background screen with the background screen still retained; thus, the present invention can prevent the background screen from being undesirably changed.

As an example, the digital mixer may further comprise a detailed setting window erasure section that, in response to detailed setting window erasure operation, erases a detailed setting window currently displayed on the display. With such an arrangement, the present invention permits prompt execution of various operation, such as parameter setting operation, with respect to the background screen currently displayed behind the detailed setting window.

According to another aspect of the present invention, there is provided an improved digital mixer, which comprises: a storage section that stores therein operational data including a plurality of parameters for controlling signal processing; a signal processing section that performs mixing processing of a plurality of channels on the basis of the operational data; a display; a channel selection section that, in response to channel selection operation, selects any one of the plurality of channels as a to-be-displayed channel; a screen selection section that, in response to screen selection operation, selects a to-be-displayed screen from among a plurality of types of screens including a screen for displaying a plurality of parameters of a given channel and causes the selected to-be-displayed screen to be displayed, but also causes parameters of the to-be-displayed channel to be displayed with respect to the to-be-displayed screen; a parameter control section that, in response to value change operation, changes a value of a parameter included in the operational data and displayed on the to-be-displayed screen; a determination section that, upon predetermined bookmark registration operation, makes a determination, on the basis of an operational state of the bookmark registration operation, as to whether the to-be-displayed channel is to be stored or not; a first storage control section that causes the to-be-displayed channel and the to-be-displayed screen to be stored into the storage section on condition that a result of the determination by the determination section is affirmative; a second storage control section that causes designation data, designating the to-be-displayed screen, to be stored into the storage section without information designating the to-be-displayed channel being included on condition that a result of the determination by the determination section is negative; and a call section that, in response to bookmark call operation, causes the to-be-displayed screen, indicated by the designation data stored in the storage section, to be displayed on the display, wherein, when the designation data includes data designating the to-be-displayed channel, the call section causes the parameters of the to-be-displayed channel, designated by the designation data, to be displayed.

According to the present invention, once the user performs bookmark registration operation, a determination is made, on the basis of an operational state of the bookmark registration operation, as to whether the to-be-displayed channel is to be stored or not, and designation data including data designating the to-be-displayed channel or designation data that does not include data designating the to-be-displayed channel is stored into the storage section; thus, the present invention permits, as necessary, setting of both a bookmark including designation of the to-be-displayed channel and a bookmark that does not include designation of the to-be-displayed channel.

The present invention may be constructed and implemented not only as the apparatus invention as discussed above but also as a method invention. Also, the present invention may be arranged and implemented as a software program for execution by a processor such as a computer or DSP, as well as a storage medium storing such a software program. Further, the processor used in the present invention may comprise a dedicated processor with dedicated logic built in hardware, not to mention a computer or other general-purpose type processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the objects and other features of the present invention, its preferred embodiments will be described hereinbelow in greater detail with reference to the accompanying drawings, in which.

DETAILED DESCRIPTION OF THE INVENTION

Figure 1:
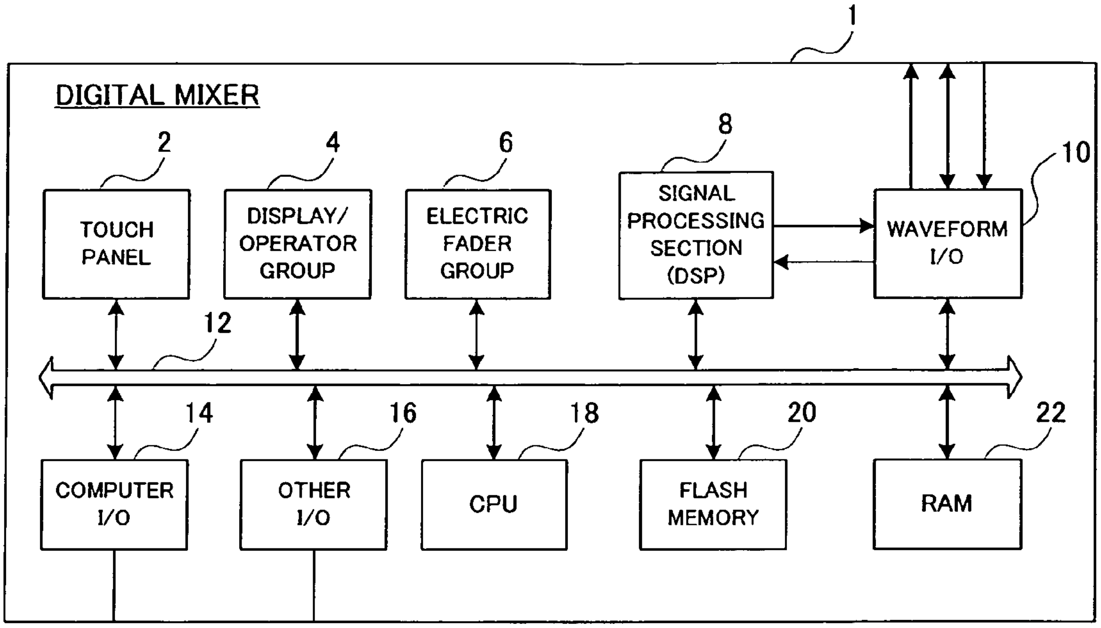
FIG. 1 is a block diagram showing a general setup of a digital mixer in accordance with an embodiment of the present invention.

1. Hardware Setup of Embodiment 1.1. General Setup:

Now, a general setup of a digital mixer in accordance with an embodiment of the present invention will be described with reference to FIG. 1. In the digital mixer of FIG. 1, reference numeral 2 represents a touch panel, which comprises a display for displaying various screens to a user on the basis of display information supplied via a bus 12 and a touch screen provided, on the surface of the display, for detecting each position thereof depressed by the user. The display of the touch panel 2 is, for example, in the form of a flat panel display having resolution of about "1024×768". Display/operator group 4 includes various knobs, switches and LED keys provided at various positions of an operation panel 30 that will be later detailed. Illuminating states of LEDs built in the individual LED keys are set via the bus 12, and respective operating states of the knobs, switches, LED keys, etc. are output via the bus 12.

Reference numeral 6 represents a group of electric faders 6 for adjusting signal levels of individual input/output channels on the basis of operation by a user or human operator. Further, the electric faders 6 are each constructed in such a manner that its operating position is automatically set in response to an operation command supplied via the bus 12. Waveform I/O section 10 is provided for inputting and outputting analog or digital signals to and from the digital mixer. In the instant embodiment, all processing, such as mixing processing and effect processing, of various audio signals are performed through digital processing. However, audio signals to be input from the outside and to be output to the outside can be both digital and analog. Thus, in the waveform I/O section 10, conversion is performed between analog and digital signals, between various types of digital signals, etc. Signal processing section 8 comprises a group of DSPs (Digital Signal Processors). The signal processing section 8 performs the mixing processing and effect processing on digital audio signals supplied via the waveform I/O section 10, and it outputs the processed results to the waveform I/O section 10.

Computer I/O section 14 communicates various control information with an external computer. Other I/O section 16 communicates time codes and other information with any of various external equipment, such as a recorder. CPU 18 controls various components of the digital mixer via the bus 12 on the basis of various control programs as will be later described. Flash memory 20 stores the control programs in its program region. Reference numeral 22 represents a RAM that is used as a working memory for the CPU 18.

In the instant embodiment of the digital mixer, various parameters (current data) for controlling current operation of the mixer are stored in a predetermined region (i.e., current region) provided in the RAM 22. Namely, as the human operator operates any of the display/operator group 4 and electric fader group 6, the current data are updated, and the mixing processing and effect processing by the signal processing section 10, displaying states of the touch panel 2, LED illuminating states of the display/operator group 4, individual fader positions of the electric fader group 6, etc. are controlled on the basis of the current data. The current data can be stored, as necessary, as "scene data" in a predetermined region (scene storage region) of the RAM 22, and the thus-stored scene data can be recalled to the current region.

Figure 2:
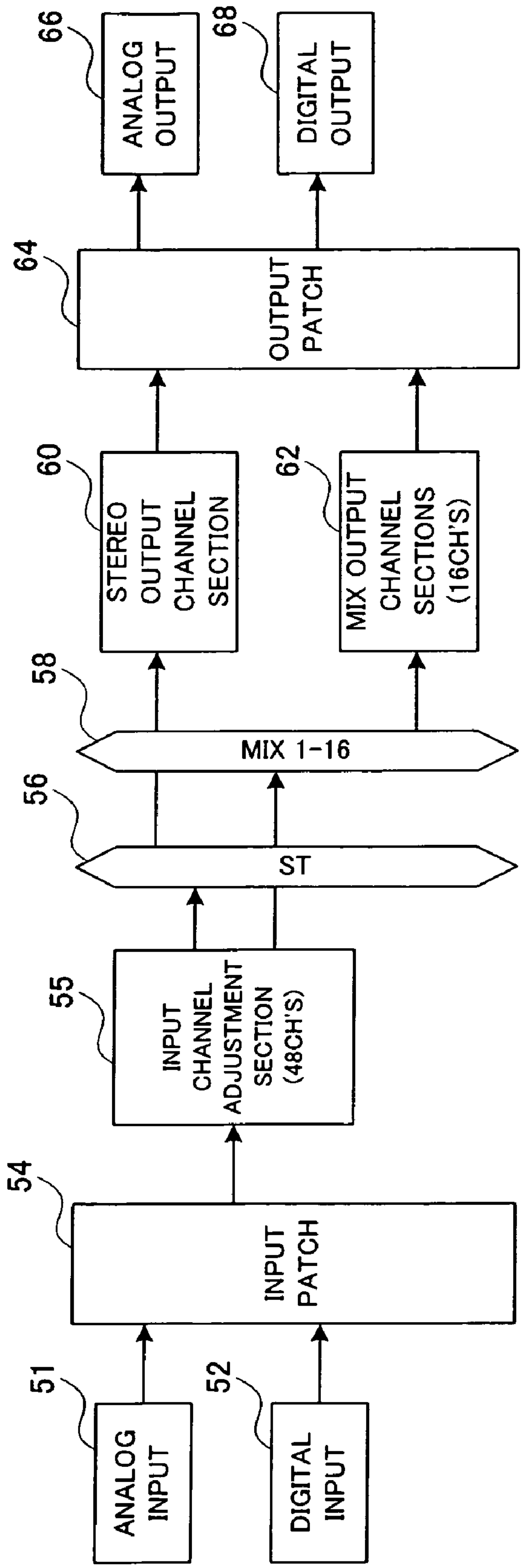
FIG. 2 is a block diagram showing an algorithm implemented in the digital mixer of FIG. 1.

1.2. Construction of Mixing Algorithm:

The following paragraphs describe details of an algorithm implemented in the signal processing section 8 etc. of the mixer, with reference to FIG. 2. The algorithm is implemented by a program set in the signal processing section 8, and the program is loaded from the flash memory 20 or the like to the signal processing section 8 under the control of the CPU 18. In FIG. 2, reference numeral 51 represents an analog input section, which, upon receipt of a microphone-level or line-level analog audio signal, converts the received analog audio signal into a digital audio signal and supplies the converted digital audio signal to the signal processing section 8. Reference numeral 52 represents a digital input section, which, upon receipt of a digital audio signal, converts the digital audio signal into an internal format of the signal processing section 8. 66 represents an analog output section, which converts a digital audio signal, supplied from the signal processing section 8, into an analog audio signal and outputs the converted analog audio signal to the outside. 68 represents a digital output section, which converts a digital audio signal of the internal format, supplied from the signal processing section 8, into a digital audio signal of a predetermined format (e.g., AES/EBU, ADAT, TASCAM or the like) and outputs the thus-converted digital audio signal to the outside.

Whereas the above-described arrangements are implemented by the waveform I/O section 10, which is separate hardware from the signal processing section 8, and various cards inserted in the waveform I/O section 10, the other arrangements than the above-described are implemented by a program running in the signal processing section 8. Reference numeral 55 represents input channel adjustment sections, which perform adjustment of sound volume, sound quality, etc. on up to 48 input channels on the basis of operation of the electric faders, knobs, etc. Reference numeral 54 represents an input patch section, which allocates audio signals, supplied from a plurality of input ports of the input sections 51 and 52 etc., to given input channels of the input channel adjustment section 55.

Reference numeral 58 represents a MIX bus group, which comprises 16 MIX buses. In each of the MIX buses, digital audio signals of the input channels supplied thereto are mixed together. In each of the input channels, whether or not the audio signal should be supplied to the MIX buses can be set separately for each of the MIX buses. If the audio signal should be supplied to the MIX buses, send (i.e., signal delivery) levels to the MIX buses and fade modes (pre-fade/post-fade modes) can also be set independently for each of the MIX buses. Stereo output bus 56 is constructed in a similar manner to the MIX buses, but a stereo audio signal in the stereo output bus 56 comprises left- and right-channel audio signals. Stereo output channel section 60 performs level adjustment and sound quality adjustment on the mixed signals output from of the stereo output bus 56. Reference numeral 62 represent MIX output channel sections, which perform level adjustment and sound quality adjustment on the mixed signals output from the MIX buses. Output patch section 64 allocates the output signals from the stereo output channel section 60 and MIX output channel sections 62 to desired output ports of the output sections 66 and 68.

Figure 3:
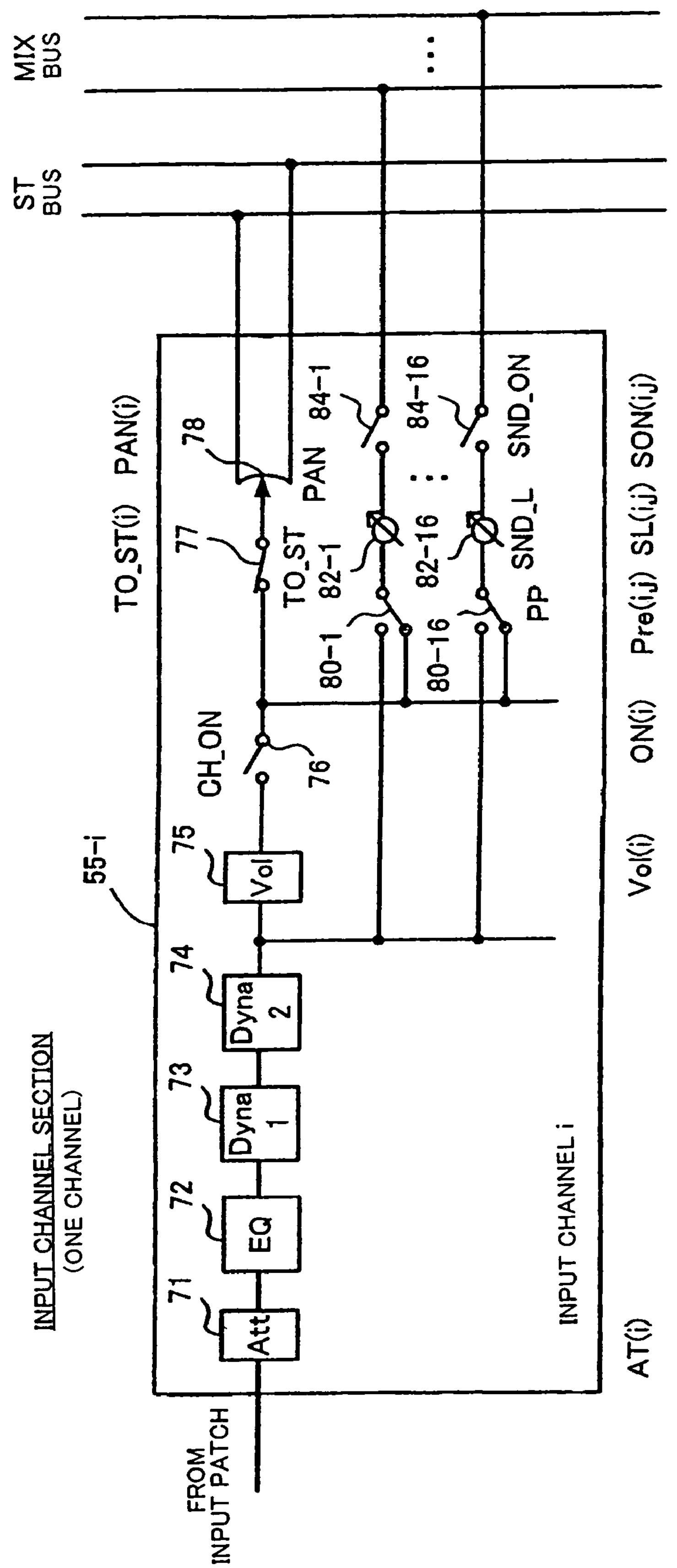
FIG. 3 is a block diagram showing details of an algorithm construction in an input channel adjustment section of the digital mixer.

Next, a description will be given about details of an algorithmic construction in the input channel adjustment section 55, with reference to FIG. 3. In FIG. 3, **55-*i* represents the ith input channel adjustment section, which performs sound quality and sound volume adjustment of the ith input channel ($1 \leqq i \leqq 48$). The ith input channel adjustment section 55-*i* includes an attenuator section 71 that attenuates an audio signal input thereto, and an equalizer section 72 that adjusts frequency characteristics of the audio signal by means of a four-band parametric equalizer etc. First and second dynamics adjustment sections 73 and 74 perform a compressor process, gate process, etc. on the input audio signal. Sound volume adjustment section 75 adjusts the gain of the audio signal of the ith input channel. Further, an ON/OFF switching section 76 switches between ON and OFF states of the entire ith input channel. Stereo send ON/OFF switching section 77 performs switching as to whether or not the audio signal of the ith input channel should be supplied to the stereo output bus 56. Panning setting section 78 sets sound volume balance between the left and right channels when the audio signal is to be supplied to the stereo output bus 56**.

80-1-80-16 represent signal switching portions that switch audio signals to be output from the ith input channel to the 16 MIX buses, in accordance with the fade mode. Namely, when the selected fade mode is the "pre-fade" mode, the output signal from the second dynamics adjustment section 74 is selected, while, when the selected fade mode is set at the "post-fade" mode, the output signal from the ON/OFF switching section 76 is selected. 82-1-82-16 represent send-level adjustment portions, which adjust the gains, i.e. send levels, with which the signal is output to the MIX buses. 84-1-84-16 represent send-on/off switching portions, which set ON/OFF states of supply of the audio signal to the MIX buses.

1.3. Panel Construction:

1.3.1 General Panel Construction:

Next, a description will be made about an example construction of the operation panel 30 employed in the instant embodiment of the digital mixer. The operation panel 30 comprises a left panel section 30*a*, middle panel section 30*b* and right panel section 30*c*. The left panel section 30*a* includes input channel strip sections 31-34 each including eight channel strips, so that the channel strip sections 31-34 adjust respective gains etc. of the 1st to 32nd input channels. The right panel section 30*c* includes input channel strip sections 35 and 36 each including eight channel strips, so that the channel strip sections 35 and 36 adjust respective gains etc. of the 33rd to 48th input channels. Stereo output channel strip section 37 includes a pair of channel strips that adjust left and right gains etc. of the stereo output channel section 60.

The middle panel section 30*b* includes the above-mentioned touch panel 2 provided generally centrally on the middle panel section 30*b*. The middle panel section 30*b* also includes a level meter section 38 that includes a plurality of level meters indicating audio signal levels at various positions of the digital mixer. Parameter manipulation section 40 includes a plurality of operators etc. for adjusting parameters etc. of a "selected channel" that is one input or output channel selected, from among the input and output channels, so that parameters etc. can be set for that channel. The input and output channels in the instant embodiment are grouped into a plurality of "groups", and these groups will be described below. A total of 48 input channels are grouped into six groups each comprising eight channels, and the 16 MIX output channels are grouped into two groups each comprising eight channels. Further, the left and right stereo output channels constitute one group. Namely, all of the input and output channels in the instant embodiment are grouped into a total of nine groups.

The middle panel section 30*b* also includes a group selection section 46 that includes a plurality of switches for selecting any one of the above-mentioned groups. Reference numeral 42 represents an assigned channel strip section that adjusts gains etc. of the channels belonging to the group selected via the group selection operation section 46. Further, detailed states of the channels belonging to the selected group are displayed on the touch panel 2. Scene operation section 44 includes switches etc. operable by the user to perform operation for setting a scene number, storing a scene and recalling a scene.

Reference numerals 47 and 48 represent bookmark switches for bookmarking (or bookmark-registering) a screen currently displayed on the touch panel 2 or calling an already-bookmarked screen. Because two bookmark switches 47 and 48 are provided, up to two bookmarks can be set in the instant embodiment. Mute operation section 49 include eight mute buttons corresponding to eight mute groups. One or more input/output channels are allocated in advance to each of the mute groups. Once any one of the mute buttons is depressed, the input/output channels that belongs to the mute group corresponding to the depressed mute button are collectively set to a silent (or zero sound-volume) state; if the faders corresponding to the input/output channels are provided on the operation panel 30, the operating position of each of these faders is also driven to a silent position.

Figure 5A:
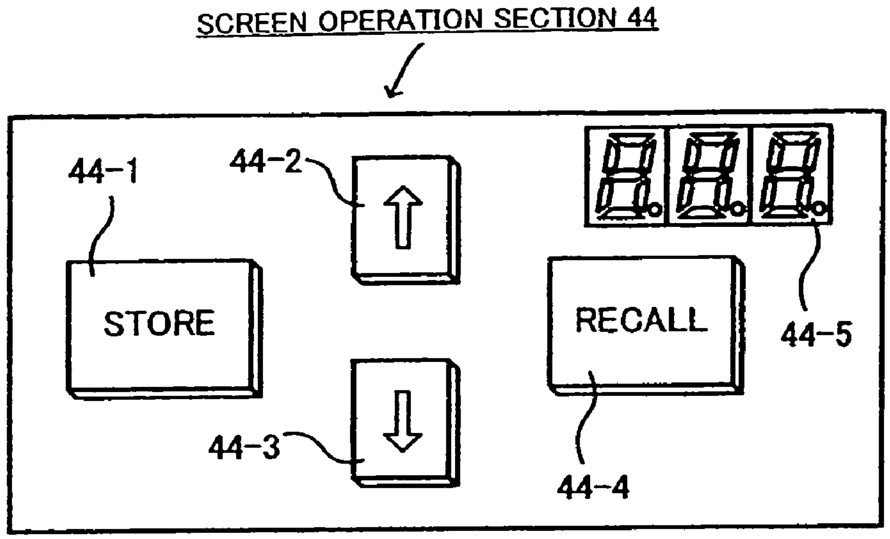
FIGS. 5A and 5B are plan views of a scene operation section and group selection operation section employed in the digital mixer.

1.3.2. Detailed Construction of Scene Operation Section 44:

Detailed construction of the operation panel 30 will be described here. First, an example detailed construction of the scene operation section 44 is explained with reference to FIG. 5A. In FIG. 5A, a scene number display section 44-5 displays a scene number of a scene to be stored or recalled. 44-2 and 44-3 are UP and DOWN switches operable to increment or decrement the scene number. STORE button 44-1 is operable to store the current data as scene data of the scene number displayed on the scene number display section 44-5. RECALL button 44-4 is operable to recall the scene data of the scene number displayed on the scene number display section 44-5 and cause the recalled scene data as the current data.

Figure 4:
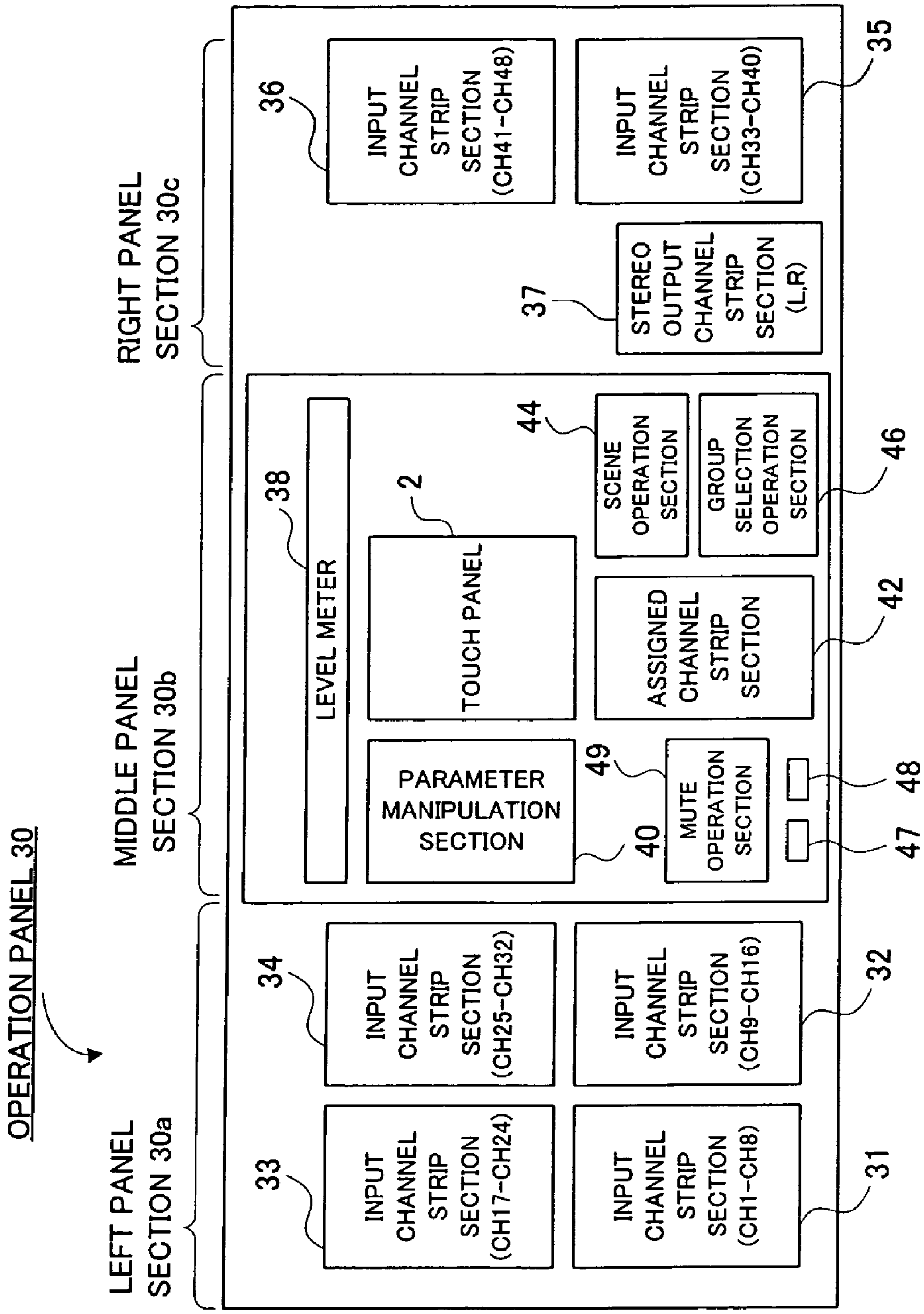
FIG. 4 is a plan view of an operation panel of the digital mixer.
Figure 5B:
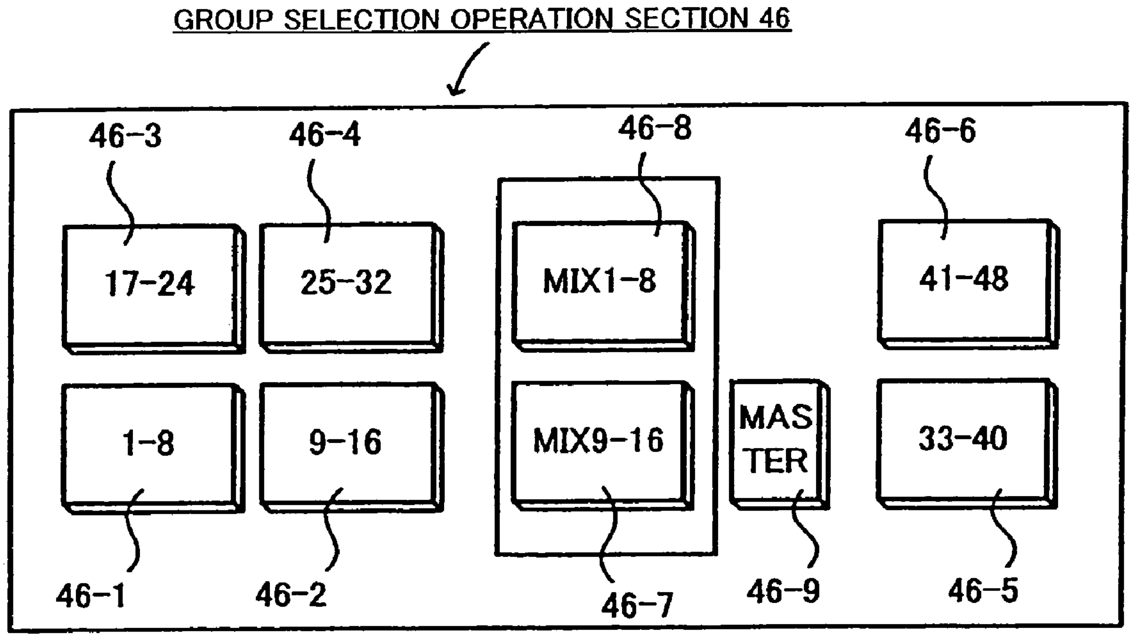

1.3.3. Detailed Construction of Group Selection Operation Section 46:

Example detailed construction of the group selection operation section 46 will be described with reference to FIG. 5B. Input channel selection keys 46-1-46-6 are operable to select any one of the six groups of the input channels. MIX output channel selection keys 46-7 and 46-8 are operable to select any one of the two groups of the MIX output channels. Stereo output channel selection key 46-9 is operable to select the stereo output channel group. These groups corresponding to the input channel selection keys 46-1-46-6 are groups corresponding to the input channel strip sections 31-36 of FIG. 4. From FIG. 5B, there can be seen that input channel selection keys 46-1-46-6 are positioned in the same physical positional relationship as the input channel strip sections 31-36 on the operation panel 30.

Stereo output channel selection key 46-9 is constructed similarly. Because the stereo output channel strip section 37 is disposed to the left of the input channel strip section 35 in FIG. 4, the stereo output channel section key 46-9 corresponding to the strip section 37 is also positioned to the left of the input channel selection key 46-5. For the MIX output channel group, no dedicated channel strip section is provided on the operation panel 30. Therefore, for the MIX output channel group, corresponding MIX output channel selection keys 46-7 and 46-8 are provided substantially centrally on the group selection operation section 46. Note that each individual element in the group selection operation section 46 is indicated by "46-*g*" (g is a natural number in a range from 1 to 9). The value "g" is used in later-described processing as an group identification number of each group.

Figure 6A:
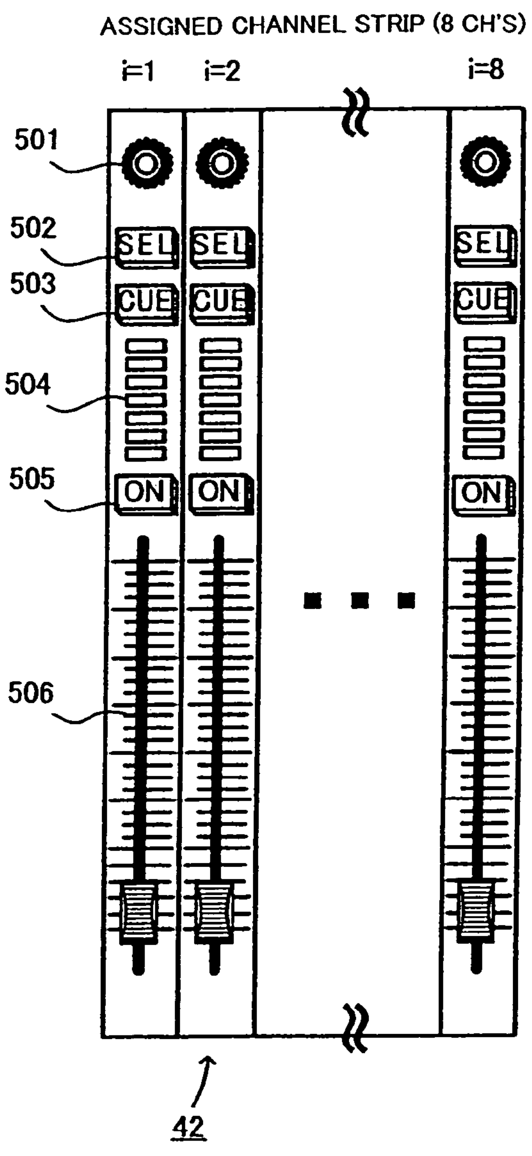
FIGS. 6A and 6B are plan views of an assigned channel strip section and input channel strip section employed in the digital mixer.

1.3.4. Detailed Construction of Assigned Channel Strip Section 42:

Next, an example detailed construction of the assigned channel strip section 42 will be described with reference to FIG. 6A. The assigned channel strip section 42 comprises eight similarly-constructed channel strips arranged in a horizontal row. The leftmost channel strip includes a knob 501 that is used for various purposes, e.g. setting of an attenuation rate in the attenuator section 71 and setting of send levels in the send-level adjustment portions 82-1-82-16. For such purposes, the knob 501 is of an endlessly-rotatable type. Namely, as the knob 501 is rotated, the corresponding parameter is set to a value corresponding to an angle through which the knob 501 has been rotated. SEL key 502 is operable to set the channel of the channel strip to a selected channel, and a CUE key 503 is operable to monitor the audio signal of the channel. Level meter 504, which comprises a plurality of LEDs, indicates an output level of the channel. ON/OFF key 505 is operable to control a state of the ON/OFF switching section 76, and an electric fader 506 is operable to control the gain of the sound volume adjustment section 75.

Figure 6B:
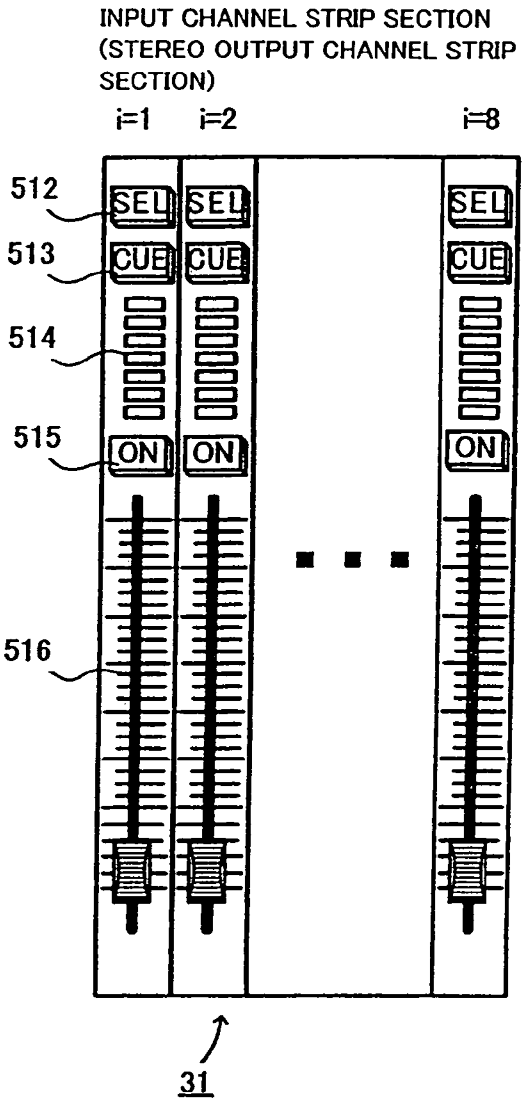

1.3.5. Detailed Construction of Input Channel Strip Sections 31-36:

Next, an example detailed construction of the input channel strip sections 31-36 will be described with reference to FIG. 6B. Each of the input channel strip sections 31-36 comprises eight similarly-constructed channel strips arranged in a horizontal row. The leftmost channel strip includes a SEL key 512, CUE key 513, level meter 514, ON/OFF key 515 and electric fader 516, which have similar functions to the components 502-506 of the above-mentioned assigned channel strip section 42. Stated differently, the input channel strip sections 31-36 do not include components corresponding to the knobs 501 of the assigned channel strip section 42. Therefore, in order to adjust a parameter adjustable via the knob 501 of a given input channel, it is only necessary to select, via the group selection operation section 46, the group to which the given input channel belongs and cause states of the group to be reflected in the assigned channel strip section 42.

2. Examples of Display Screens 2.1. Background Page 100:

The following paragraphs describe various display screens to be displayed on the display of the touch panel 2.

Figure 7:
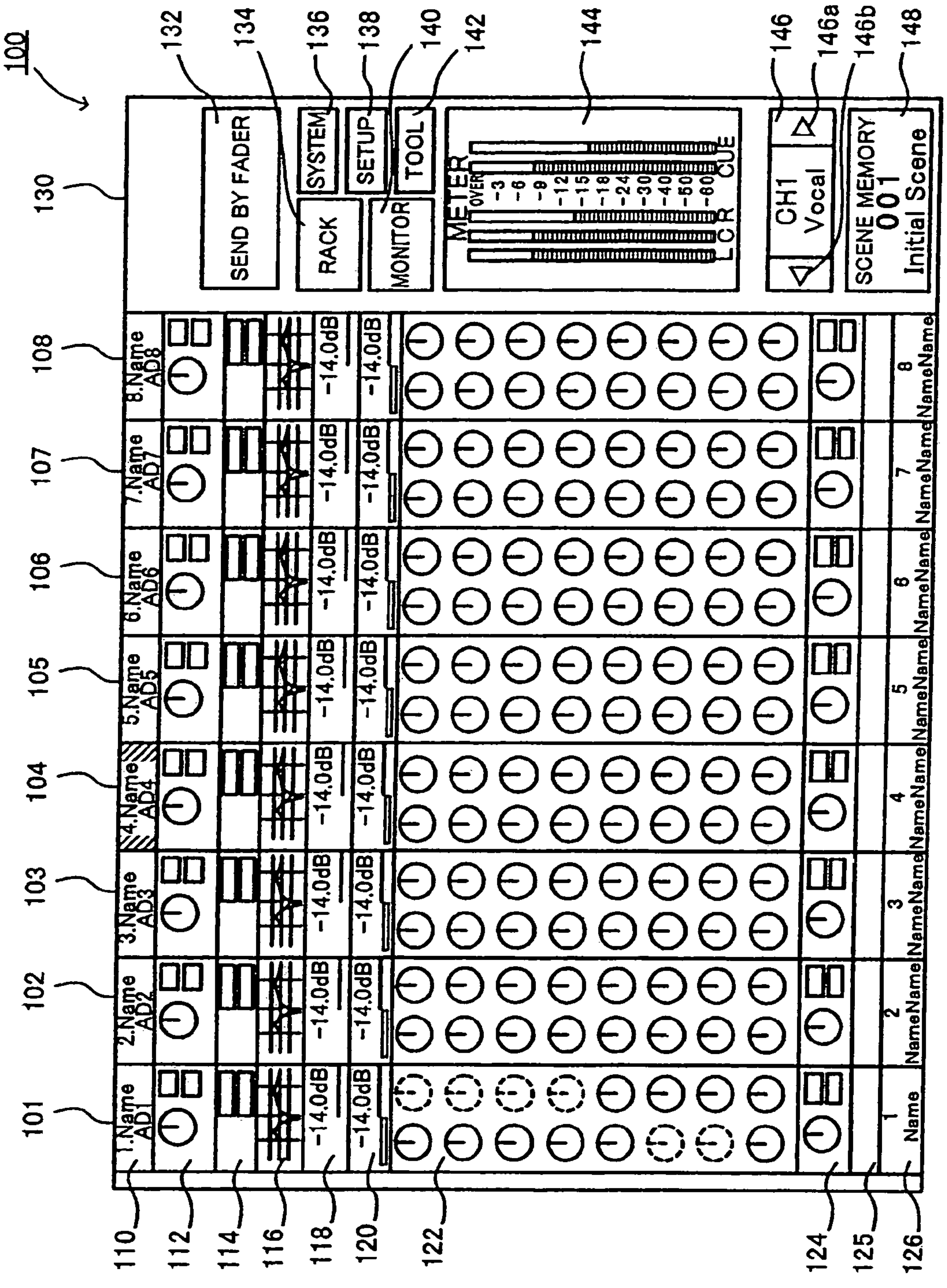
FIG. 7 is a view showing an example of a background page displayed in the digital mixer.

First, FIG. 7 shows an example of a background page 100 displayed in response to selection of any one of the groups. In the illustrated example of FIG. 7, channel strip sections 101-108 are displayed in correspondence with the eight channels belonging to the selected group. Common section 130 is always displayed, regardless of which of the groups has been selected. The channel strip section 101 includes a heading section 110 that indicates a channel number and simplified channel name (short name) of the input/output channel corresponding to the channel strip section 101.

If the selected channel is among the channels corresponding to the channel strip sections 101-108, the heading section 110 of the selected channel is displayed in a different color from those of the other channels (as indicated by hatching in FIG. 7). This different-color display will hereinafter be referred to as "heading section cursor". Input gain display section 112 displays general outline of settings of a gain etc. of the input port corresponding to the channel, namely, settings of a gain etc. of the input port of the analog or digital input section 51 or 52 connected to the channel via the input patch section 54 of FIG. 2. Especially, a knob image is displayed in the input gain display section 112, to indicate the gain of the input port. Insertion effecter display section 114 indicates, among other things, whether or not an insertion effect, graphic equalizer, etc. are currently inserted between the attenuator section 71 and the equalizer section 72.

Equalizer display section 116 indicates, in a small graph, general outline of characteristics set via the equalizer section 72 of the channel. 118 and 120 represent first and second dynamics display sections, which indicate general outline of characteristics set via the dynamics adjustment sections 73 and 74, respectively. Send level display section 122 comprises 16 knob images, equal in number to the send-level adjustment portions 82-1-82-16, for displaying send levels of the send-level adjustment portions 82-1-82-16. Some of the knob images are sometimes blanked (i.e., made invisible), as indicated by broken lines in the figure, to indicate that the corresponding send-on/off switching portions 84-1-84-16 are currently set in the OFF state. Stereo output display section 124 indicates, by a knob image and the like, current settings of the stereo send ON/OFF switching section 77 and panning setting section 78 of the channel in question. Channel name display section 126 indicates a channel name (long name) of the channel.

Figure 8:
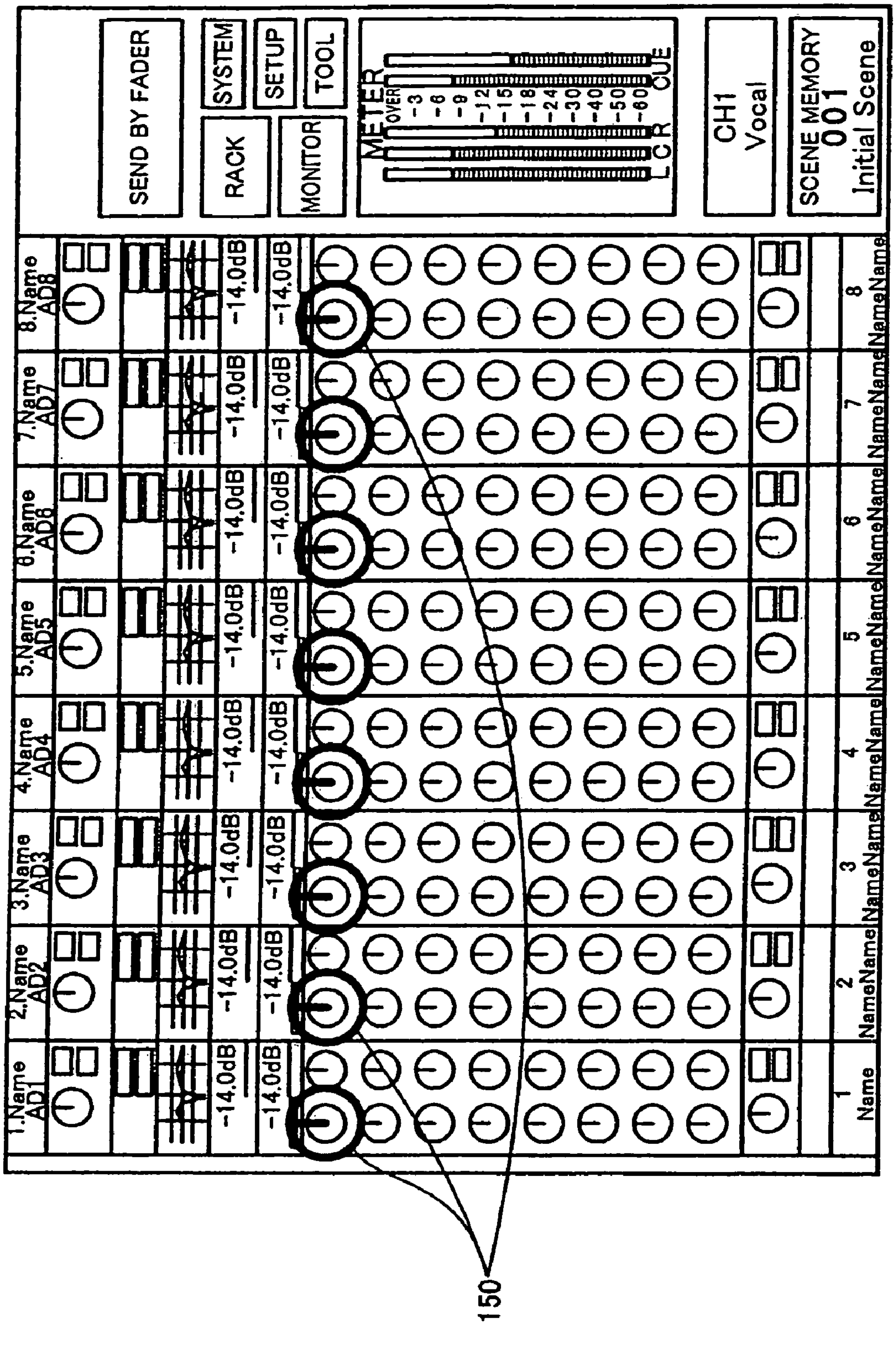
FIG. 8 is a view showing an example manner in which knob image cursors are displayed on the background page.

As noted above, knob images are displayed on the input gain display section 112, send level display section 122 and stereo output display section 124. Once the user depresses with a finger a desired one of the knob images, eight knob image cursors 150 are displayed in overlapping relation to the depressed knob image and other knob images at corresponding positions of the channel strip sections 101-108, as shown in FIG. 8. The knob image cursors 150 indicate that parameters corresponding to the cursor positions are adjustable via the knobs 501. Thus, various functions can be allocated to the knobs 501.

On the aforementioned display sections 112-124, there can be displayed corresponding detailed sewing windows. These detailed setting windows can display detailed parameters that are not displayed on the respective display sections 112-124, and these parameters can be edited on the detailed setting windows. Manner of displaying the detailed setting window differs between some of the display sections 112-124 including the knob images and the others of the display sections 112-124 including no such knob image. Namely, once any one of the display sections including the knob images is depressed, the knob image cursors 150 are displayed in overlapping relation to the knob images at corresponding positions as noted above. Then, once any one of the knob images where the knob image cursors 150 are displayed is depressed, the corresponding detailed setting window is displayed on the background page 100. On the other hand, once any one of the display sections including no knob image is depressed, the corresponding detailed setting window is displayed directly.

Referring back to FIG. 7, the common section 130 includes various function buttons 132-142 that are associated with various functions of the digital mixer. Once any one of the function buttons 132-142 is depressed, the detailed setting window corresponding to the depressed function button is displayed. The detailed setting windows corresponding to the depressed function buttons have no particular relation to the "channels". Meter section 144 displays an audio output level of the stereo output channel, etc. Selected channel designation section 146 displays a current selected channel, and the selected channel can be changed by depression of any of scroll buttons 146*a* and 146*b* provided at opposite ends of the channel designation section 146. Scene number display section 148 displays a current scene number.

The terms "detailed setting window" as used in connection with the instant embodiment refer to a pop-up window that is displayed in response to depressing operation of any one of the display sections 112-124, function buttons 132-142 and knob image cursors 150 and that is used to display/set details of parameters of the mixing algorithm etc. Thus, mere confirming windows, such as pop-up windows including an OK button, CANCEL button, etc. and intended to request user's execution/conformation, are not included in the category of the "detailed setting window".

2.2. Detailed Dynamics Setting Window 200:

The following paragraphs describe several examples of the aforesaid detailed setting windows.

Figure 9:
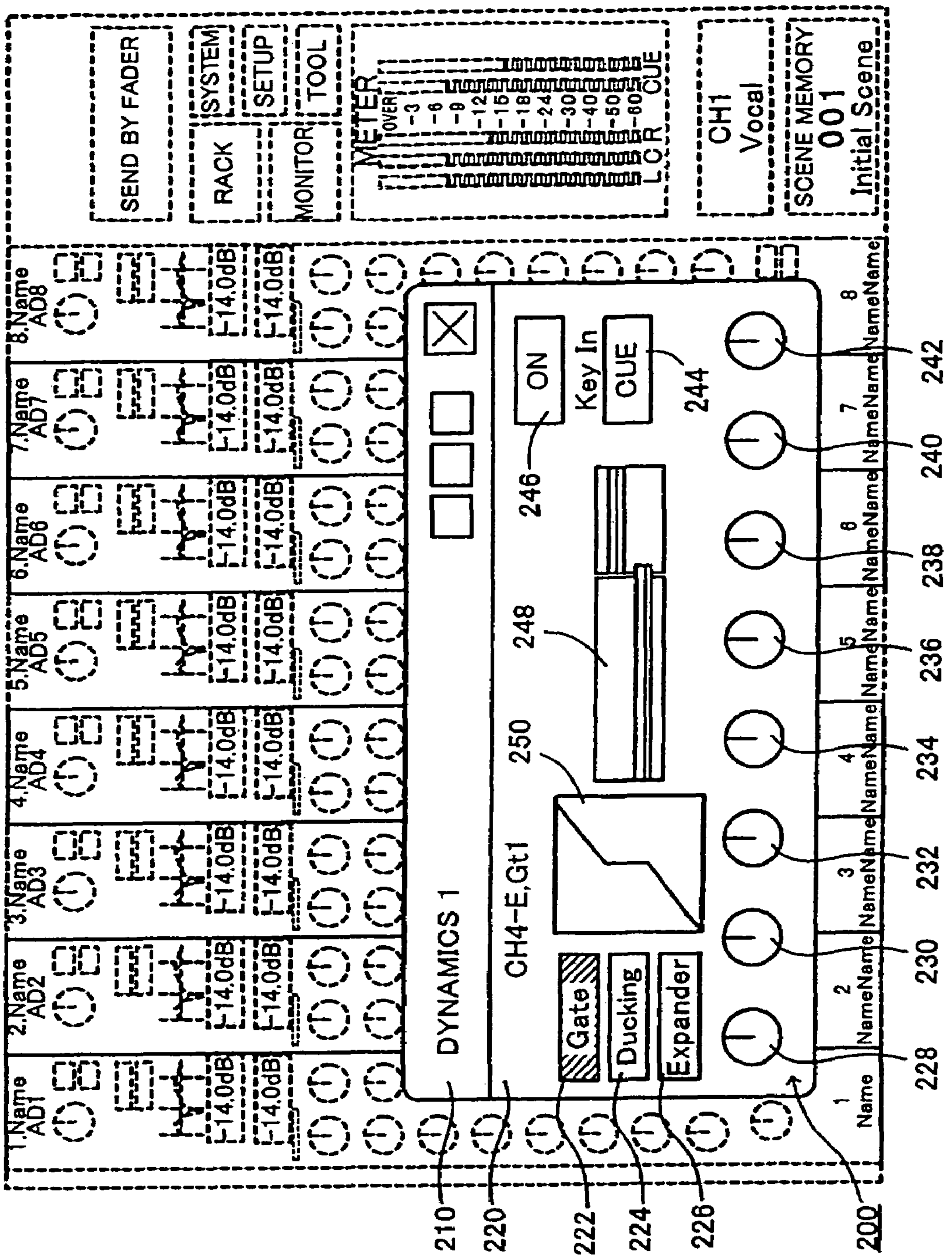
FIG. 9 is a view showing an example of a detailed first-dynamics setting window displayed in the digital mixer.

Once the first dynamics display section 118 of any one of the channel strip sections 101-108 is depressed on the background page 100 of FIG. 7, a detailed first-dynamics setting window 200 of FIG. 9 is displayed on the touch panel 2; at that time, the background page 100 is blanked (as indicated by broken lines in the figure). The detailed first-dynamics setting window 200 includes a title bar 210, and a field section 220 where various images are displayed. The field section 220 includes various selection buttons 222, 224 and 226, any one of which can be selected at a time and illuminated upon selection (the illuminated button 222, 224 or 226 is depicted by hatching) Characteristic graph section 250 indicates, in a line graph, an input/output level characteristic of the corresponding first dynamics adjustment section 73. ON/OFF button 246 sets an ON/OFF state of the dynamics characteristic; when the dynamics characteristic is set to the OFF state, the input/output level characteristic becomes linear with the gain kept constant.

Eight knob images 228-242 display values of various parameters in the first dynamics adjustment section 73. Once any one of the knob images 228-242 is depressed, the knob image cursors 150 are displayed in overlapping relation to the knob images 228-242 (see FIG. 8). In this way, it becomes possible to adjust the corresponding parameters via the eight knobs 501 of the assigned channel strip section 42. In the instant embodiment, the knob images 228-236 of the knob images 228-242 have functions for displaying values of parameters, such as “threshold value”, “rate”, “attack”, “hold”, “decay” and “range”; however, the other knob images 238, 240 and 242 are dummy knob images having no particular function. These dummy knob images are provided in order to allow the user to readily identify correspondency between the knob images and the knobs 501 by arranging the eight knob images in the horizontal direction; note that the dummy knob images need not necessarily be displayed.

Figure 10:
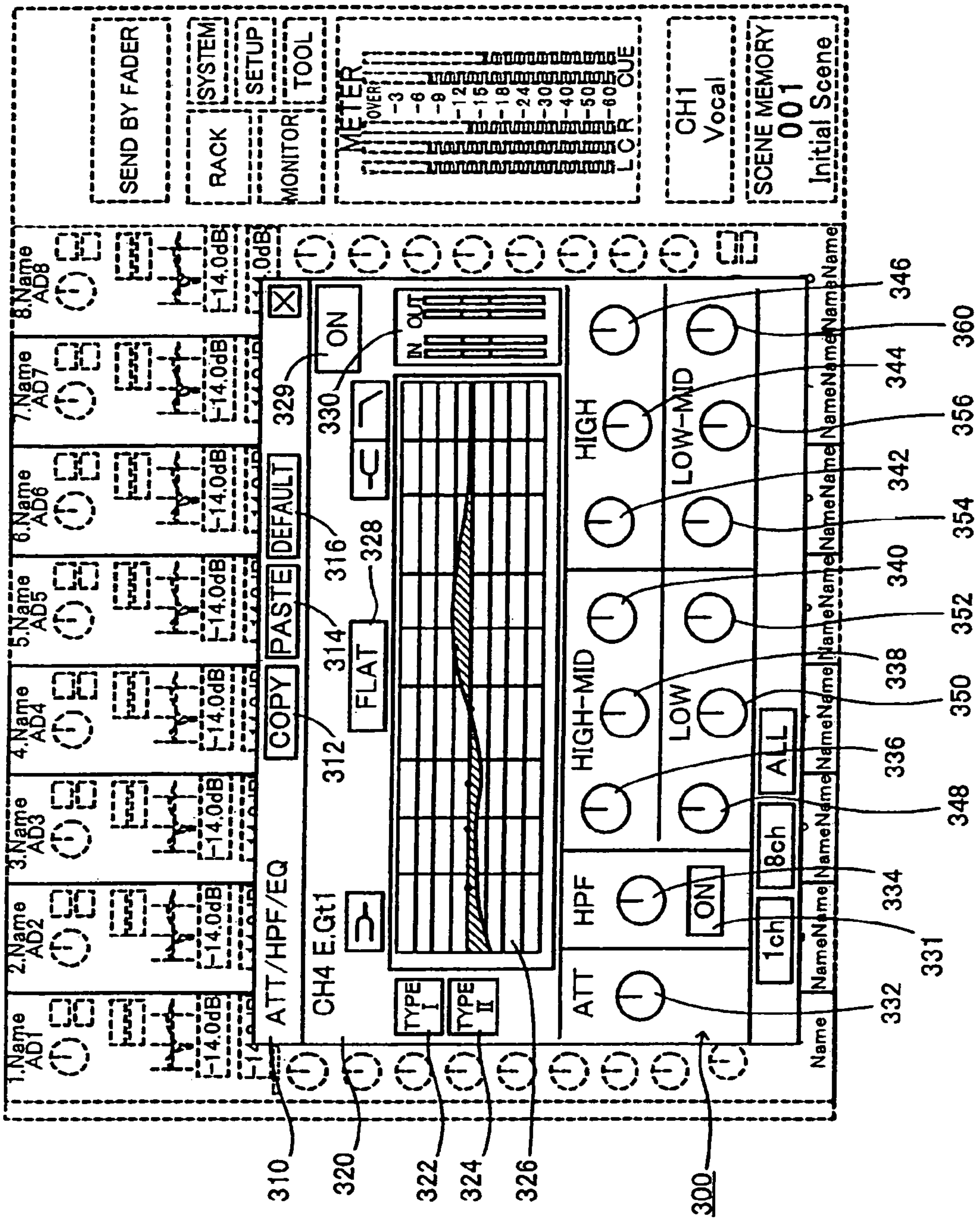
FIG. 10 is a view showing an example of a detailed equalizer setting window displayed in the digital mixer.

2.3. Detailed Equalizer Setting Window 300:

Once the equalizer display section 116 of any one of the channel strip sections 101-108 is depressed on the background page 100 of FIG. 7, a detailed equalizer setting window 300 of FIG. 10 is displayed on the touch panel 2. The detailed equalizer setting window 300 includes a title bar 310, and a field section 320 where various images are displayed. The field section 320 includes a characteristic display section 326 that indicates, in a graph, a frequency characteristic of the corresponding equalizer section 72. Flat button 328 is operable to compulsorily make the frequency characteristic flat. ON/OFF button 329 sets an ON/OFF state of the equalizer section 72. When the equalizer section 72 is set to the OFF state, the input/output frequency characteristic becomes flat. Level display section 330 displays levels of signals input and output to and from the equalizer section 72, and an attenuator knob image 332 displays an attenuation rate currently set in the attenuator section 71.

High-pass filter ON/OFF button 331 sets/displays an ON/OFF state of a high-pass filter. High-pass filter knob image 334 displays a cut-off frequency of the high-pass filter included in the equalizer section 72. 336-360 represent parametric equalizer knob images. The equalizer section 72 includes a parametric equalizer for four bands: low band (LOW); low-middle band (LOW-MID); high-middle band (HIGH-MID); and high band (HIGH), and parameters of a center frequency, gain and sharpness (Q) can be set for each of the bands. Thus, a total of 12 knob images are displayed for the parametric equalizer.

Once any one of the knob images 332-346 is depressed, the knob image cursors 150 are displayed in overlapping relation to the knob images 332-346 (see FIG. 8). In this way, it becomes possible to adjust the corresponding parameters via the eight knobs 501 of the assigned channel strip section 42. Further, once any one of the knob images 348-360 is depressed, the knob image cursors 150 are displayed in overlapping relation to the attenuator knob image 332 and high-pass filter knob image 334 as well as to the knob images 348-360. Namely, regardless of which of the knob images has been depressed, the knob image cursors 150 are always displayed in overlapping relation to the attenuator knob image 332 and high-pass filter knob image 334. By thus always displaying eight knob image cursors 150, the user is allowed to readily identify correspondency between the eight knob images and the eight knobs 501. Further, with the knob image cursors 150 always kept displayed in relation to the knob images pertaining to frequently-adjusted parameters, it is possible to eliminate the trouble of changing the positions of the knob image cursors 150 and thereby achieve enhanced operability.

Figure 11:
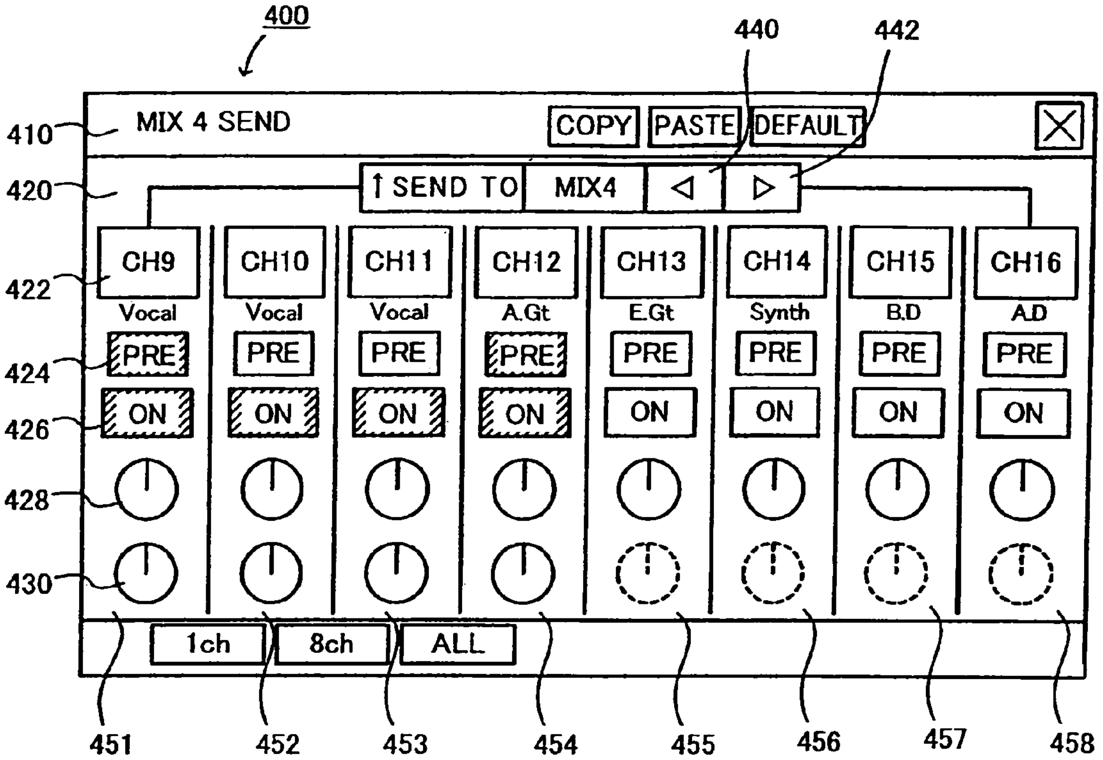
FIG. 11 is a view showing an example of a detailed send-level setting window displayed in the digital mixer.

2.4. Detailed Send-Level Setting Window 400:

Once any one of the knob image cursors 150 is depressed by the user while the knob image cursors 150 are being displayed at positions, corresponding to the “fourth MIX bus”, in the individual send level display sections 122 on the background page 100 of FIG. 7, a detailed send-level setting window 300 of FIG. 11 is displayed on the touch panel 2 (illustration of the background page 100 is omitted in FIG. 11). The detailed send-level setting window 400 includes a title bar 410, and a field section 420 where various images are displayed. Here, “MIX4 SEND” displayed in the title bar 410 indicates that send levels etc. of the individual input channels to the fourth MIX bus are to be adjusted. The field section 420 includes channel-corresponding sections 451-458 for displaying send levels etc. of eight input channels, belonging to one group, to the fourth MIX bus. Selection buttons 440 and 442 are operable to increment or decrement the number of the MIX bus to be subjected to the adjustment on the detailed send-level setting window 400. In response to the selection of the new MIX bus, the displayed contents of the title bar 410, later-described displaying/setting sections 424 and 426, later-described knob images 428 and 430, etc. are updated.

The channel-corresponding section 451 includes a channel number display section 422, which displays the channel number of the channel of which the send level etc. are to be displayed. Fade mode displaying/setting section 424 is set to an illuminated state when the current fade mode of the signal switching portion 80-4 (see FIG. 3), indicative of signal connection from the corresponding input channel to the fourth MIX bus, is “pre-fade”, but set to a deilluminated state when the current fade mode of the signal switching portion 80-4 is “post-fade”. ON/OFF displaying/setting section 426 is set to an illuminated state when the send-on/off switching portion 84-4 is in the ON state, but set to a deilluminated state when the send-on/off switching portion 84-4 is in the OFF state. Further, once the user depresses the fade mode displaying/setting section 424 or ON/OFF displaying/setting section 426, the fade mode or ON/OFF state is switched. Panning knob image 428 displays a state of sound volume balance between the left and right channels. Whereas each of the MIX buses in the instant embodiment is a monaural bus, the instant embodiment may allow the odd-numbered MIX buses and even-numbered MIX buses to be used as left and right channels, respectively, by pairing the odd-numbered MIX buses and even-numbered MIX buses immediately following the odd-numbered MIX buses; the panning knob image 428 displays sound volume balance between the thus-paired channels. Send level knob image 430 displays a gain set in the send-level adjustment section 82-4.

Once the panning knob image 428 of any one of the channel-corresponding sections 451-458 is depressed, the knob image cursors 150 are displayed in overlapping relation to the eight panning knob image 428 in the individual channel-corresponding sections 451-458. Thus, the corresponding parameters are adjustable via the eight knobs 501 in the assigned channel strip section 42. When the corresponding send ON/OFF switching section 84-4 is OFF, the send level knob image 430 is blanked (as indicated by broken lines in the figure); thus, the user is allowed to readily recognize that no audio signal is actually output to the fourth MIX bus although the send level adjustment is possible.

3. Behavior of the Embodiment 3.1. Variables:

The following paragraphs explain primary variables used in various programs before going into a description of the behavior of the embodiment.

(1) Group number g: This indicates an ID number of the group selection keys 46-*g* (FIG. 5B). Because a background page is identified by each group selection key 46-*g*, the group number g is used also as the identification number of the background page.

(2) Background page number HP: This is a group number g of a background page currently displayed on the touch panel 2.

(3) Selected channel number SC: This is a channel number of a current selected channel.

(4) Group-specific selected channel GSC(g): In each of the groups, a group-specific selected channel is defined apart from the selected channel number SC. Group-specific selected channel corresponding to the group number g is indicated by "GSC(g)".

(5) Pop-up number PP: This is an identification number of a currently-displayed detailed setting window (pop-up window). Each of the detailed setting windows is assigned in advance a unique identification number of "1" or more. If the pop-up number PP is "0", it means that none of the detailed setting windows is currently displayed.

(6) Bookmark switch number g: This is an identification number of each of the bookmark switches 47 and 48.

(7) Bookmark designation channel number BC(b): This is a channel number designated in relation to the bookmark switch number g. If the bookmark designation channel number BC(b) is "0", it means that there is no channel number designated, because the channel number is of a value not smaller than "1".

(8) Bookmark pop-up number BPP(b): This is a pop-up number PP of a detailed setting window designated in relation to the bookmark switch number g. When no detailed setting window is designated, the bookmark pop-up number BPP(b) takes a value "0".

(9) Bookmark background page number BHP(b): This is a page number HP of a background designated in relation to the bookmark switch number g.

3.2. Selected Channel Designation Event Process (FIG. 12):

Now, a description will be made about a process performed in response to occurrence of a selected channel designation event, with reference to FIG. 12. Such a selected channel designation event occurs, for example, when the SEL key 502 or 512 (see FIG. 6) has been depressed.

Figure 12:
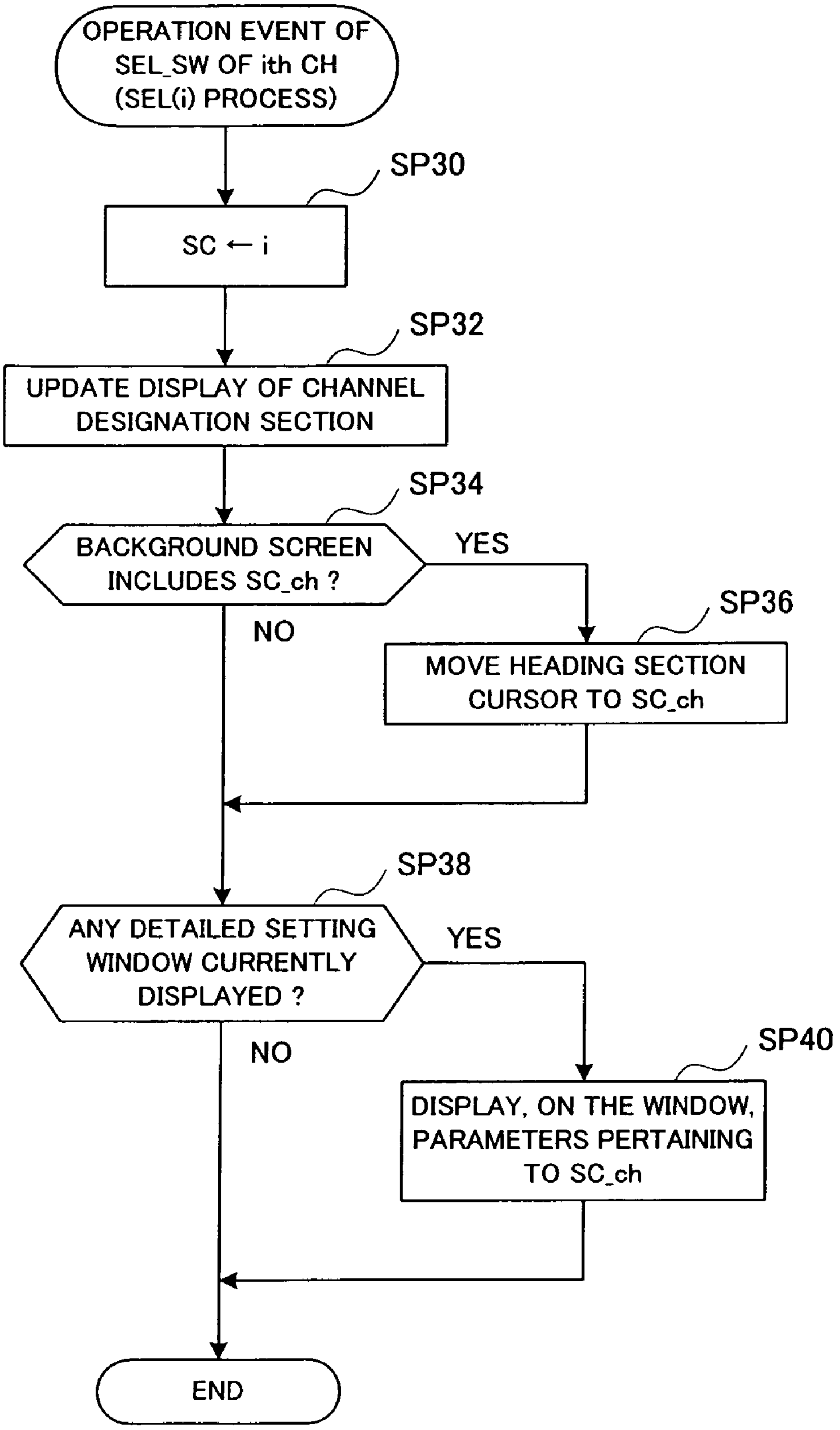
FIG. 12 is a flow chart of a selected channel designation event process routine performed in the digital mixer.

At step SP30 of FIG. 12, the selected channel number SC is set to a designated channel number i (e.g., when the SEL key 502 or 512 has been depressed, the selected channel number SC is set to the channel number designated by the depression of the SEL key). At next step SP32, the display of the channel designation section 146 (see FIG. 7) is updated in accordance with the new selected channel number SC.

At following step SP34, a determination is made as to whether displays pertaining to the selected channel number SC are currently made in the channel strip sections 101-108 of the current background page. With a YES determination at step SP34, the process goes to step SP36, where a heading section cursor is moved to the heading section 110 (see FIG. 7) of the channel strip images of the selected channel number SC. With a NO determination at step SP34, on the other hand, step SP36 is skipped.

Then, at step SP38, a determination is made as to whether or not any detailed setting window is currently displayed. With a YES determination at step SP38, the process goes to step SP40, where parameters pertaining to the selected channel number SC are displayed on the detailed setting window. For example, when the selected channel number SC has been changed to the number of the eighth input channel, the detailed first-dynamics setting window 200, which displays characteristics of the fourth input channel in the illustrated example of FIG. 9, is updated with characteristics of the eighth input channel. Note that, at step SP40, no substantive operation is performed on the detailed setting windows displayed via the various function buttons 132-142 in the common section 130.

Figure 13A:
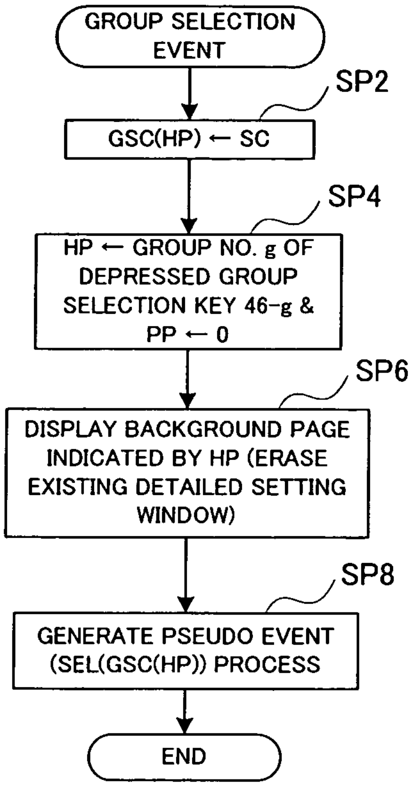
FIGS. 13A-13D are flow charts of various other routines performed in the digital mixer.

3.3 Group-Selection Event Process (FIG. 13A):

Once an ON event of any one of the group selection keys 46-*g* occurs in the group selection operation section 46 (see FIG. 5), a group-selection-key ON event process routine of FIG. 13A is started. At step SP2 of the group-selection-key ON event process routine, the value of the group-specific selected channel GSC(HP) related to the current background page number HP is changed to the current selected channel number SC. This is for the purpose of restoring the current selected channel number SC as the selected channel number SC when the current background page is again displayed through a later-described process. At following step SP4, the background page number HP is changed to the group number g of the depressed group selection key 46-*g*, and the pop-up number PP is set to "0". This is because, even when any detailed setting window is currently displayed on the current background page, there is little need to keep displaying the detailed setting window on the newly-displayed background page.

Then, at step SP6, the displayed contents on the touch panel 2 are updated on the basis of the new background page number HP, so that the background page is updated with that based on the background page number HP. However, because the pop-up number PP has been set to "0", no detailed setting window is displayed. At following step SP8, a pseudo event is generated which is equivalent to the event generated in response to depression of the SEL key corresponding to the group-specific selected channel GSC(HP). Thus, the selected channel designation event process of FIG. 12 is performed with the group-specific selected channel GSC(HP) as the channel number i. Because there always exits the group-specific selected channel GSC(HP) pertaining to the current background page, the heading section cursor is moved to that channel strip image.

Figure 13B:
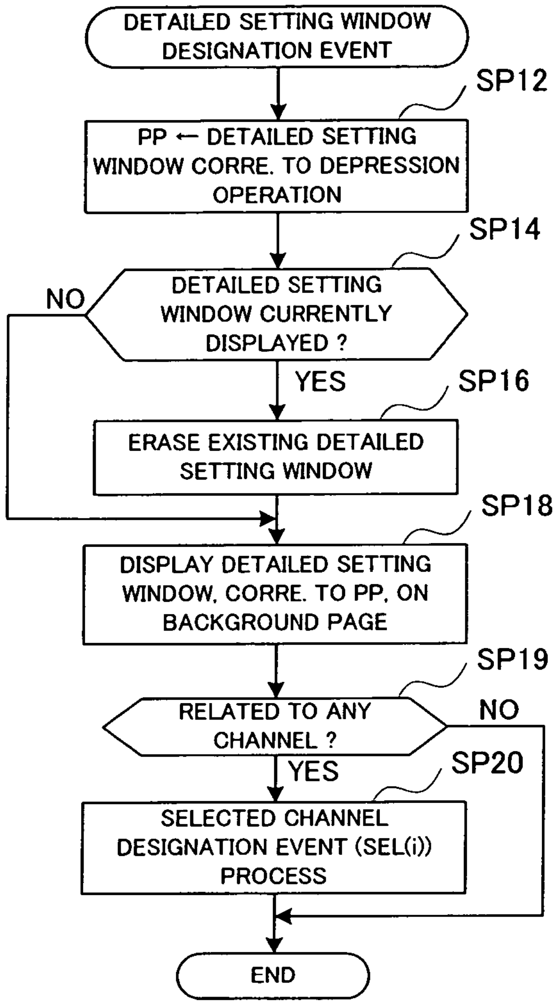

3.4. Detailed-Setting-Window Designation Event Process (FIG. 13B):

Once any one of the display sections 112-124, function buttons 132-142 and knob images displayed with the knob image cursors 150 shown in FIG. 7 is depressed, the corresponding detailed setting window is displayed through a detailed-setting-window designation event process of FIG. 13B. At step SP 12 of the detailed-setting-window designation event process, the value of the pop-up number PP is set to the identification number of the detailed setting window corresponding to the depression operation. At next step SP14, a determination is made as to whether any detailed setting window has already been displayed on the touch panel 2. With a YES determination at step SP14, the process moves on to step SP16, where the already-displayed detailed setting window is erased from the display screen. With a NO determination at step SP14, on the other hand, step S16 is skipped. At following step SP18, the detailed setting window corresponding to the pop-up number PP is displayed on the background page.

Then, at step SP19, a determination is made as to whether the operation for causing the detailed setting window to be displayed is operation related to any channel. Namely, depression of any one of the display sections 112-124 and knob image cursors 150 in the channel strip sections 101-108 is operation related to the channel number i of the channel strip section, while operation of the function buttons 132-142 in the common section 130 is operation that is not related to any channel. With a YES determination at step SP19, the process moves on to step SP20, where the selected channel designation event process of FIG. 12 is performed with the channel number i as an argument. Because there always exits the group-specific selected channel GSC(HP) pertaining to the current background page, the heading section cursor is moved to that channel strip image (step S36), so that the selected channel number SC is reflected in the displayed detailed setting window (step S40).

One characteristic feature of the instant embodiment is that, when operation has been performed for displaying a new detailed setting window during display of a previous detailed setting window, the previous detailed setting window is erased as noted above in relation to step S16. Namely, if a plurality of detailed setting windows are displayed concurrently, the screen of the touch panel 2 would look very complicated so that it would be difficult for the user to operate. The instant embodiment can forestall such an inconvenience by erasing the previous detailed setting window in displaying a new detailed setting window.

Figure 13C:
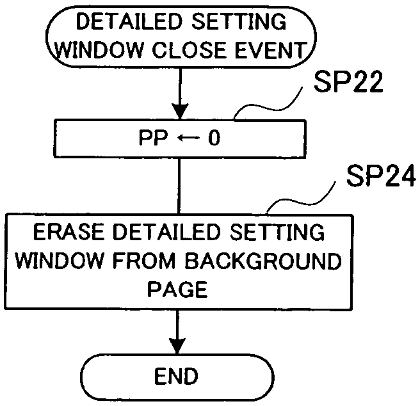

3.5. Detailed-Setting-Window Close Process (FIG. 13C):

Once the user depresses a CLOSE button (i.e., "X" button at the upper right corner of each window) or depresses a portion of the background page while any detailed setting window is being displayed, a detailed-setting-window close process routine of FIG. 13C is started up. At step SP22 of the close process, the pop-up number PP is set to "0". Then, at step SP24, the detailed setting window displayed on the background page is erased. Once the detailed-setting-window is erased, the background having been blanked so far is restored to the normal (i.e., non-blanked) displayed state.

Figure 13D:
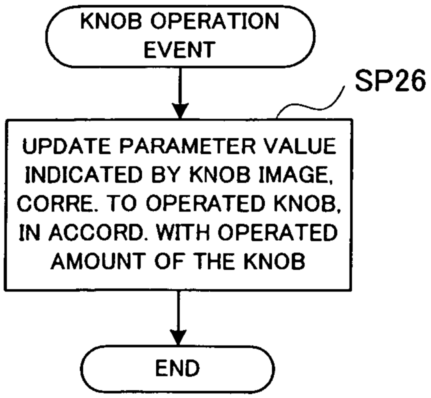

3.6. Knob Operation Event (FIG. 13D):

As any one of the knobs 501 in the assigned channel strip section 42 is operated, clockwise or counterclockwise rotating movement of the knob 501 is detected per predetermined unit angle, and a knob operation event routine of FIG. 13D is started up. At step SP26 of the knob operation event routine, the parameter, indicated by the knob image corresponding to the operated knob 501 among the plurality of knob images displayed with the cursors 150, is changed by a predetermined amount corresponding to an operated amount of the knob. Further, on the screen, the corresponding knob image too is rotated clockwise or counterclockwise. Thus, as the knob 501 is rotated to a certain amount, the knob operation event routine is performed repetitively a plurality of times in accordance with the predetermined unit angles through which the knob 501 has been rotated, so that the parameter change and the updating of the knob image are executed in response to the operation of the knob 501.

Figure 14:
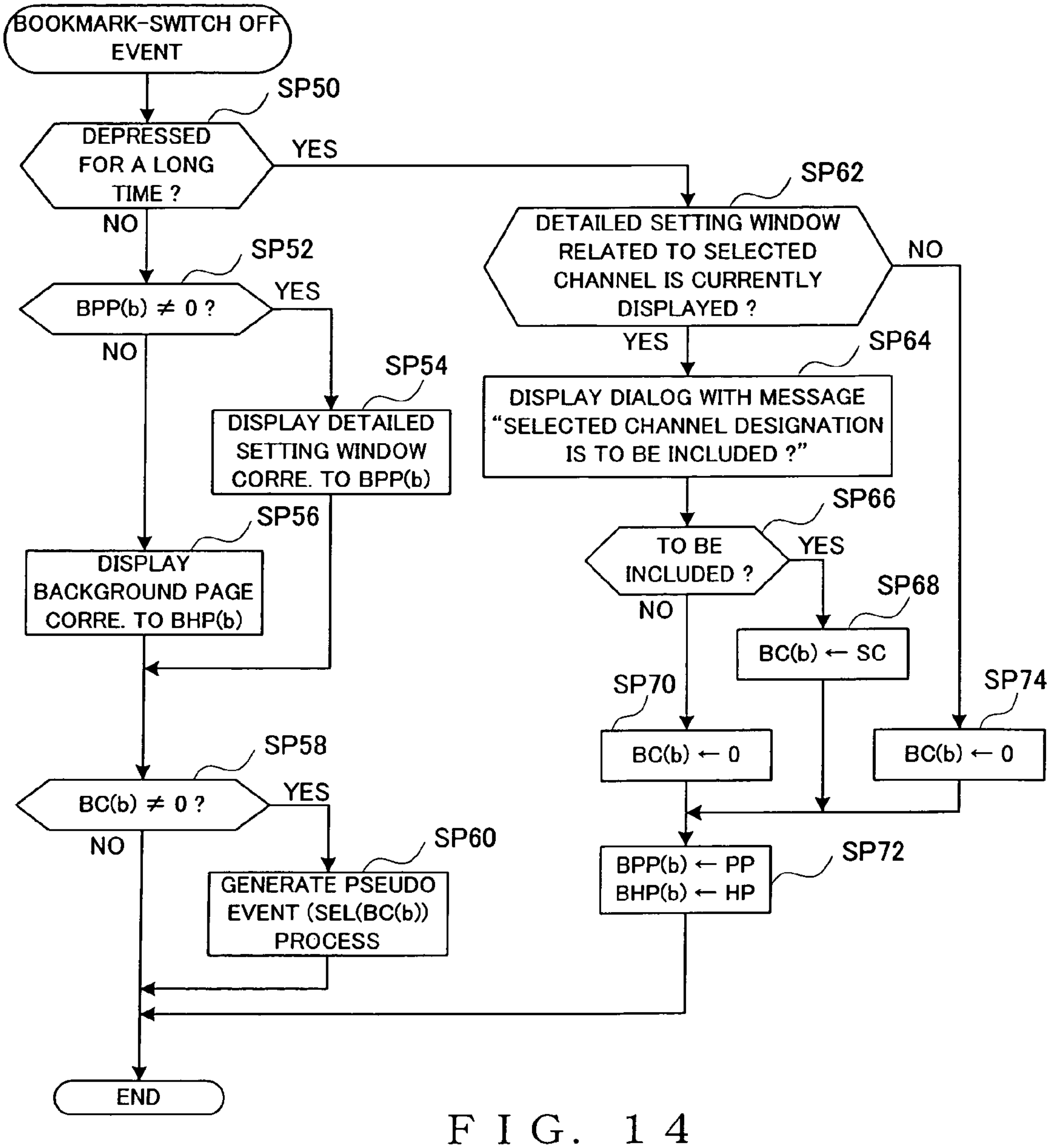
FIG. 14 is a flow chart of a bookmark-switch OFF operation event process performed in the digital mixer.

3.7. Bookmark-Switch OFF Operation Event (FIG. 14):

Next, with reference to FIG. 14, a description will be given about a bookmark-switch OFF operation event process which is started up as any one of the bookmark switches 47 and 48 is depressed (i.e., turned on) and then released (i.e., turned off). At step SP50 of the bookmark-switch OFF operation event process of FIG. 14, a determination is made as to whether or not the bookmark switch has been depressed for more than a predetermined time. With a YES determination at step SP50, the process goes to step SP62, where a further determination is made as to whether a detailed setting window for making settings pertaining to the selected channel is currently displayed on the display of the touch panel 2. With a YES determination at step SP62, the process moves on to step SP64, where a dialog with "YES" and "NO" buttons is displayed together with a message "selected channel designation is to be included?".

Once the "YES" or "NO" button is depressed in the dialog, the dialog is closed, and then the process goes to step SP66. At step SP66, a determination is made as to whether the selected channel designation is to be included (namely, to be stored), i.e. which of the "YES" and "NO" buttons has been depressed. If the "YES" button has been depressed as determined at step SP66, the process goes to step S68, where the bookmark switch number of the depressed bookmark switch 47 or 48 is set to "b" and the value of the bookmark designation channel number BC(b) is changed to the selected channel number SC. If, on the other hand, the "NO" button has been depressed as determined at step SP66, the process goes to step S70, where the value of the bookmark designation channel number BC(b) is set to "0".

With a NO determination at step SP62, the value of the bookmark designation channel number BC(b) is set to "0" without the above-mentioned dialog being displayed. If no detailed setting window for making settings pertaining to the selected channel is currently displayed on the display of the touch panel 2, a NO determination is made at step SP62, so that the value of the bookmark designation channel number BC(b) is set to "0" at step SP74. This is because the instant embodiment of the digital mixer is designed so that any other channel than the eight channels being displayed as the background page can be set as the selected channel and that the background page is arranged to store a group-specific selected channel GSC(g) per group number g. Namely, there would arise a possibility of the user getting confused if the selected channel designation is included in the bookmarking of the background page, and thus, the instant embodiment is arranged to prevent such a confusion.

Then, at step S72, the value of the bookmark pop-up number BPP(b) is set to the pop-up number PP of the currently-displayed detailed setting window. When no detailed setting window is currently displayed, the pop-up number PP is "0", so that the bookmark pop-up number BPP(b) too is set to "0". Because no pop-up number PP is assigned to a mere confirming dialog etc., such a confirming dialog etc. will not be stored as the bookmark pop-up number BPP(b). Thus, in calling bookmarked content, it is possible to prevent a confirming dialog etc. from being displayed. Further, at step SP72, the value of the bookmark background page number BHP(b) is set to the current background page number HP.

The following operations are performed when the bookmark switch has not been depressed for a long time. In such a case, a "NO" determination is made at step S50, so that the process moves on to step SP52. At step SP52, a determination is made as to whether there is any other value than "0" as the bookmark pop-up number BPP(b), i.e. whether there is any detailed setting window to be displayed. With a "YES" determination at step SP52, the process moves on to step SP54, where the detailed setting window corresponding to the bookmark pop-up number BPP(b) is displayed on the touch panel 2; at that time, the background page on the touch panel 2 is left unchanged. Thus, in this case, the bookmark background page number BHP(b) currently stored in association with the bookmark switch number b is ignored. With a "NO" determination at step SP52, on the other hand, the process moves on to step SP56, where the background page corresponding to the bookmark background page number BHP(b) is displayed on the touch panel 2.

Namely, another characteristic feature of the instant embodiment is that the current background page is retained. Namely, even in the case where the bookmark background page number BHP(b) is stored, it is conceivable that the user wants the detailed setting window corresponding to the bookmark pop-up number BPP(b) to be displayed without the bookmark background page being displayed, as long as the bookmark pop-up number BPP(b) is stored. Thus, the instant embodiment is arranged to prevent the background page from being changed despite an intention of the user, by displaying the detailed setting window on the current background page as described above.

Then, at step SP58, a determination is made as to whether the bookmark designation channel number BC(b) is of a value other than "0". With a YES determination at step SP58, the process goes to step SP60, where a pseudo event is generated which is equivalent to the event generated in response to depression of the SEL key corresponding to the bookmark designation channel number BC(b). Thus, the selected channel designation event process of FIG. 12 is performed with the bookmark designation channel number BC(b) as the channel number i. Note that the bookmark designation channel number BC(b) takes a value other than "0" when a detailed setting window exists at the time of bookmarking and the aforementioned operation of step SP68 has been executed. In this case, the channel for which the detailed setting window is to be displayed is changed to a channel corresponding to the bookmark designation channel number BC(b).

4. Modification

The present invention is not limited to the above-described embodiment and may be modified variously as follows.

(1) The above-described embodiment is arranged to perform various processing various programs executed by the CPU 18. In an alternative, the programs alone may be stored on a storage medium, such as a CD-ROM or flexible disk, for distribution via the storage medium, or may be distributed via transmission paths.

(2) Whereas step SP64 in the embodiment has been described as displaying a dialog for confirming whether selected channel designation is to be included (namely, stored) or not, the selection as whether the selected channel designation is to be included (namely, stored) or not need not necessarily be made using a dialog. For example, arrangements may be made such that the selected channel designation is included (namely, stored) when the user has depressed the bookmark switch 47 or 48 while depressing a predetermined shift switch provided, for example, near the bookmark switches 47 and 48 and that the selected channel designation is not included (namely, not stored) when the user has depressed the bookmark switch 47 or 48 without depressing the shift switch. In another alternative, arrangements may be made such that, when the bookmark switch 47 or 48 has been depressed alone, the selected channel designation may not be included, while, when the bookmark switch 47 or 48 has been depressed with the SEL key of a given one of the channels, the given channel may be bookmarked and stored as the selected channel.

(3) Further, the embodiment has been described as making the selection as to whether the selected channel designation is to be included or not when the user depresses the bookmark switch 47 or 48 for bookmark-registration. Alternatively, whether the selected channel designation is to be included or not may be preset separately for each of the bookmark switches 47 and 48.

(4) Further, whereas step SP72 in the embodiment has been described as storing both of the bookmark pop-up number BPP(b) and bookmark background page number BHP(b), the bookmark pop-up number BPP(b) and bookmark background page number BHP(b) need not necessarily be stored together. Namely, at subsequent steps SP52-SP56, only one of the detailed setting window corresponding to the bookmark pop-up number BPP(b) and the detailed setting window corresponding to the bookmark background page number BHP(b) is selected and displayed on the basis of whether or not the bookmark designation channel number BC(b) is of a value other than "0". Thus, at step S72, only the pop-up number PP of a current pop-up window may be stored as the bookmark pop-up number BPP(b) if the pop-up number PP of the current pop-up window at the time of execution of the step is "1" or over, but only the bookmark background page number BHP(b) may be stored if the pop-up number PP of the current pop-up window at the time of execution of the step is "0".

(5) Further, the embodiment has been described in relation to the case where the bookmark designation channel number BC(b) is invariably set to "0" at step SP74 following step SP62. Alternatively, when bookmarking a background page as well, the operations of steps SP64-SP70 may be carried out so that bookmark-registration including selected channel registration can be made in accordance with a selection by the user.

What is claimed is:

1. A digital mixer comprising:

a storage section that stores therein operational data including a plurality of parameters;

a signal processing section that performs mixing processing of an algorism on the basis of the operational data, the algorism comprising input channels for inputting and controlling audio signals and mixing buses for mixing the controlled audio signals selectively supplied from the input channels;

a display;

a background screen selection section that, in response to a first selection operation performed by a user, selects one of background screens and displays the selected background screen on said display, each of the background screen showing general parameters of a group of input channels among the input channels stored in said storage section;

a detailed setting window display section that, in response to a second selection operation performed by the user, selects one of detailed setting windows and displays the selected detailed setting window in front of the background screen currently displayed on said display, each of the detailed setting windows showing detailed parameters of one or more of the input channels stored in said storage section;

a parameter control section that, in response to a value change operation performed by the user on a given parameter shown on the detailed setting window or the background screen currently displayed at a frontmost layer on the display, changes a value of the parameter in said storage section;

a bookmark registration section that, in response to a registration operation performed by the user when any one of the detailed setting windows is currently displayed on said display, stores, into said storage section, designation data indicative of the one detailed setting window, wherein, in response to registration operation performed by the user when no detailed setting window is currently displayed on said display, said bookmark registration section stores, into said storage section, designation data indicative of the background screen currently displayed on said display and not indicative of any detailed setting window; and a bookmark call section that, in response to a call operation performed by the user, determines whether or not the designation data stored in said storage section is indicative of any detailed setting window, and when the determination is affirmative, displays the detailed setting window indicated by the designation data in a frontmost layer of the background screen currently displayed on said display, and when the determination is negative, displays the background screen indicated by the designation data on said display.

2. A digital mixer as claimed in claim 1 which further comprises a detailed setting window erasure section that, in response to an erasure operation performed by the user, erases a detailed setting window currently displayed on said display.

3. A digital mixer as claimed in claim 1 wherein the background screen displayed on said display via said background screen selection section includes a plurality of frames, each containing a part of parameters shown on the background screen, and wherein said second selection operation is a user's operation of selecting one of the frames on the background screen currently displayed on said display, said detailed setting window display section displays a detailed setting window corresponding to the selected frame, showing detailed parameters relating to the part of the parameters contained in the selected frame.

4. A computer-readable storage medium storing a group of computer-executable instructions which, when executed by a processor of a digital mixer, cause the processor to perform a display control method, said digital mixer including a storage section that stores therein operational data including a plurality of parameters, a signal processing section that performs mixing processing of an algorism on the basis of the operational data, and a display, the algorism comprising input channels for inputting and controlling audio signals and mixing bases for mixing the controlled audio signals selectively supplied from the input channels, said display control method comprising:

a step of, in response to a first selection operation performed by a user, selecting one of background screens and displaying the selected background screen on the display, each of the background screen showing general parameters of a group of input channels among the input channels stored in said storage section;

a step of, in response to a second selection operation performed by the user, selecting one of detailed setting windows and displaying the selected detailed setting window in front of the background screen currently displayed on the display, each of the detailed setting windows showing detailed parameters of one or more of the input channels stored in said storage section;

a step of, in response to a value change operation performed by the user on a given parameter shown on the detailed setting window or the background screen currently displayed at a frontmost layer on the display, changing a value of the parameter in said storage section;

a bookmark-registration step of, in response to a registration operation performed by the user when any one of the detailed setting windows is currently displayed on said display, storing, into the storage section, designation data indicative of the one detailed setting window, wherein, in response to registration operation performed by the user when no detailed setting window is currently displayed on said display, said bookmark-registration step stores, into the storage section, designation data indicative of the background screen currently displayed on said display and not indicative of any detailed setting window; and a bookmark call step of, in response to a call operation performed by the user, determining whether or not the designation data stored in said storage section is indicative of any detailed setting window, and when the determination is affirmative, displaying the detailed setting window indicated by the designation data in a frontmost layer of the background screen currently displayed on said display, and when the determination is negative, displaying the background screen indicated by the designation data on said display.

5. A digital mixer comprising:

a storage section that stores therein operational data including a plurality of parameters;

a signal processing section that performs mixing processing of an algorism on the basis of the operational data, the algorism comprising input channels for inputting and controlling audio signals and mixing buses for mixing the controlled audio signals selectively supplied from the input channels;

a display;

a channel selection section that, in response to a channel selection operation performed by a user, selects any one of the input channels as a selected channel;

a screen selection section that, in response to a screen selection operation performed by the user, selects a screen from among a plurality of screens including one or more first screens each for showing a part of parameters of a given selected channel and displays the selected screen on said display, and when the selected screen is one of the first screens, also causes parameters of the selected channel in said storage section to be shown on the selected screen on said display;

a parameter control section that, in response to a value change operation performed by the user on any one of the parameters shown on the selected screen on said display, changes a value of the parameter in said storage section;

a determination section that, in response to registration operation performed by the user, determines, on the basis of an instruction given from the user, as to whether or not the selected channel is to be stored;

a first registration section that is operative when the determination is affirmative and that stores, into said storage section, designation data indicative of the selected channel and the selected screen;

a second registration section that is operative when the determination is negative and that stores, into said storage section, designation data indicative of the selected screen and not indicative of the selected channel; and a bookmark call section that, in response to a call operation performed by the user, selects a screen indicated by the designation data stored in said storage section as the selected screen, selects an input channel indicated by the designation data as the selected channel if the designation data is indicative of the selective channel, and displays the selected screen on said display, and when the selected screen is one of the first screens, also causes parameters of the selected channel in said storage section to be shown on the selected screen on said display.

6. A computer-readable storage medium storing a group of computer-executable instructions which, when executed by a processor of a digital mixer, cause the processor to perform a display control method, said digital mixer including a storage section that stores therein operational data including a plurality of parameters, a signal processing section that performs mixing processing of an algorism on the basis of the operational data, and a display, the algorism comprising input channels for inputting and controlling audio signals and mixing buses for mixing the controlled audio signals selectively supplied from the input channels, said display control method comprising:

a step of, in response to a channel selection operation performed by a user, selecting any one of the input channels as a selected channel;

a step of, in response to a screen selection operation performed by the user, selecting a screen from among a plurality of screens including one or more first screens each for showing a part of parameters of a given selected channel and displaying the selected screen on said display, and when the selected screen is one of the first screens, also causing parameters of the selected channel in said storage section to be shown on the selected screen on said display;

a step of, in response to a value change operation performed by the user on any one of the parameters shown on the selected screen on said display, changing a value of the parameter in said storage section;

a determination step of, in response to registration operation performed by the user, determining, on the basis of an instruction given from the user, as to whether or not the selected channel is to be stored;

a first registration step of, when the determination made by said determination step is affirmative, storing, into said storage section, designation data indicative of the selected channel and the selected screen;

a second registration step of, when the determination made by said determination step is negative, storing, into said storage section, designation data indicative of the selected screen and not indicative of the selected channel; and a bookmark call step of, in response to a call operation performed by the user, selecting a screen indicated by the designation data stored in the storage section as the selected screen, selecting an input channel indicated by the designation data as the selected channel if the designation data is indicative of the selected channel, and displaying the selected screen on said display, and when the selected screen is one of the first screens, also causing parameters of the selected channel in said storage section to be shown on the selected screen on said display.

* * * * *